United States Patent
Hall

(10) Patent No.: US 9,656,165 B2
(45) Date of Patent: *May 23, 2017

(54) CAMPUS ALERTING VIA WIRELESS GEOCAST

(71) Applicant: AT&T INTELLECTUAL PROPERTY I, LP, Atlanta, GA (US)

(72) Inventor: Robert J. Hall, Berkeley Heights, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 31 days.

This patent is subject to a terminal disclaimer.

(21) Appl. No.: 14/477,997

(22) Filed: Sep. 5, 2014

(65) Prior Publication Data

US 2014/0378090 A1 Dec. 25, 2014

Related U.S. Application Data

(63) Continuation of application No. 13/890,423, filed on May 9, 2013, now Pat. No. 8,868,027, which is a
(Continued)

(51) Int. Cl.
*H04M 11/04* (2006.01)
*H04L 29/06* (2006.01)
(Continued)

(52) U.S. Cl.
CPC .............. *A63F 13/31* (2014.09); *A63F 13/10* (2013.01); *A63F 13/12* (2013.01); *A63F 13/211* (2014.09);
(Continued)

(58) Field of Classification Search
CPC .................................................... H04H 20/59
(Continued)

(56) References Cited

U.S. PATENT DOCUMENTS 5,483,667 A 1/1996 Faruque
5,686,901 A 11/1997 Chen
(Continued)

FOREIGN PATENT DOCUMENTS

WO WO 02/054671 A2 7/2002
WO WO 2007/016641 2/2007

OTHER PUBLICATIONS

Hall, "Combinatorial Communications Modeling of Real-Time Engagement Adjudication Architectures", 2005 IEEE Military Communications Conference, Oct. 2005, vol. 3, 1488-1494.
(Continued)

*Primary Examiner* — Joshua Schwartz
(74) *Attorney, Agent, or Firm* — Baker & Hostetler LLP

(57) ABSTRACT

A geocast alerting system employs wireless geocast transmissions to deliver customized alerting messages to particular geographic areas. Geocast alerting regions and sub-regions can be defined within the system. Upon notice of the occurrence of an emergent situation, one or more geographic areas that may potentially be affected by the emergent situation are determined. The potentially effected geographic regions are compared with geocast alerting regions and sub-regions corresponding to particular geographic areas. Target alerting regions that should receive alerting messages are identified based on the comparison. The content of alerting messages can be tailored for each target alerting region. The content of alerting messages can contain distinct portions of content, each portion tailored based upon one or more conditions related to communications devices within the target alerting region.

20 Claims, 9 Drawing Sheets

Related U.S. Application Data continuation of application No. 12/643,346, filed on Dec. 21, 2009, now Pat. No. 8,483,652.

(60) Provisional application No. 61/258,167, filed on Nov. 4, 2009.

(51) Int. Cl.

| | | |
|---|---|---|
| A63F 13/31 | (2014.01) | |
| G06Q 30/02 | (2012.01) | |
| H04W 4/00 | (2009.01) | |
| A63F 13/216 | (2014.01) | |
| A63F 13/40 | (2014.01) | |
| A63F 13/30 | (2014.01) | |
| H04L 12/18 | (2006.01) | |
| H04W 4/02 | (2009.01) | |
| H04W 4/04 | (2009.01) | |
| H04H 20/59 | (2008.01) | |
| H04W 4/22 | (2009.01) | |
| A63F 13/211 | (2014.01) | |
| A63F 13/812 | (2014.01) | |
| A63F 13/95 | (2014.01) | |
| H04W 84/18 | (2009.01) | |

(52) U.S. Cl.
CPC ........... *A63F 13/216* (2014.09); *A63F 13/40* (2014.09); *A63F 13/812* (2014.09); *A63F 13/95* (2014.09); *G06Q 30/0261* (2013.01); *H04H 20/59* (2013.01); *H04L 12/1845* (2013.01); *H04W 4/001* (2013.01); *H04W 4/008* (2013.01); *H04W 4/02* (2013.01); *H04W 4/04* (2013.01); *H04W 4/22* (2013.01); *A63F 2300/1093* (2013.01); *A63F 2300/406* (2013.01); *A63F 2300/66* (2013.01); *A63F 2300/69* (2013.01); *H04L 12/189* (2013.01); *H04W 4/021* (2013.01); *H04W 4/027* (2013.01); *H04W 4/028* (2013.01); *H04W 84/18* (2013.01)

(58) Field of Classification Search
USPC .......................................... 455/404.1, 414.3
See application file for complete search history.

(56) References Cited

U.S. PATENT DOCUMENTS

| | | | |
|---|---|---|---|
| 6,015,344 A | 1/2000 | Kelly et al. | |
| 6,069,885 A | 5/2000 | Fong et al. | |
| 6,119,976 A | 9/2000 | Rogers | |
| 6,195,751 B1 | 2/2001 | Caronni et al. | |
| 6,304,556 B1 | 10/2001 | Haas | |
| 6,428,470 B1 | 8/2002 | Thompson | |
| 6,628,620 B1 | 9/2003 | Cain | |
| 6,781,971 B1 | 8/2004 | Davis et al. | |
| 6,807,165 B2 | 10/2004 | Belcea | |
| 6,816,460 B1 | 11/2004 | Ahmed et al. | |
| 6,870,846 B2 | 3/2005 | Cain | |
| 6,873,613 B1 | 3/2005 | Dent | |
| 6,879,574 B2 | 4/2005 | Naghian et al. | |
| 6,909,706 B2 | 6/2005 | Wilmer et al. | |
| 6,937,602 B2 | 8/2005 | Whitehill et al. | |
| 6,940,832 B2 | 9/2005 | Saadawi et al. | |
| 6,954,435 B2 | 10/2005 | Billhartz et al. | |
| 6,958,986 B2 | 10/2005 | Cain | |
| 6,987,777 B1 | 1/2006 | Cain et al. | |
| 7,027,822 B1 | 4/2006 | Hwang et al. | |
| 7,152,110 B2 | 12/2006 | Pierce | |
| 7,179,166 B1 | 2/2007 | Abbott | |
| 7,197,326 B2 | 3/2007 | Acampora | |
| 7,295,521 B2 | 11/2007 | Choi et al. | |
| 7,307,978 B2 | 12/2007 | Carlson | |
| 7,435,179 B1 | 10/2008 | Ford | |
| 7,525,933 B1 | 4/2009 | Hall | |
| 7,540,028 B2 | 5/2009 | Ahmed et al. | |
| 7,613,467 B2 | 11/2009 | Fleischman | |
| 7,669,052 B2 | 2/2010 | Asano et al. | |
| 7,813,326 B1 | 10/2010 | Kelm et al. | |
| 7,864,168 B2 | 1/2011 | French | |
| 7,895,273 B1 | 2/2011 | Haldar | |
| 7,917,169 B1 | 3/2011 | Hall | |
| 7,969,914 B1 | 6/2011 | Gerber | |
| 7,970,749 B2 | 6/2011 | Uhlir et al. | |
| 8,073,327 B2 | 12/2011 | Mayer | |
| 8,085,813 B2 | 12/2011 | Melick et al. | |
| 8,128,405 B2 | 3/2012 | Preston et al. | |
| 8,149,801 B2 | 4/2012 | Hall | |
| 8,149,846 B2 | 4/2012 | Mutnuru et al. | |
| 8,248,367 B1 | 8/2012 | Barney et al. | |
| 8,332,544 B1 | 12/2012 | Ralls et al. | |
| 8,341,271 B2 | 12/2012 | Cho et al. | |
| 8,359,643 B2 | 1/2013 | Low et al. | |
| 8,376,857 B1 | 2/2013 | Shuman et al. | |
| 8,483,616 B1 | 7/2013 | Hall | |
| 8,483,652 B2 | 7/2013 | Hall | |
| 8,599,848 B2 | 12/2013 | Janneteau | |
| 2001/0014094 A1 | 8/2001 | Epley | |
| 2002/0085582 A1 | 7/2002 | Kim | |
| 2002/0113872 A1 | 8/2002 | Kinjo | |
| 2002/0141454 A1 | 10/2002 | Muniere | |
| 2002/0155846 A1 | 10/2002 | Shiraga | |
| 2002/0167960 A1 | 11/2002 | Garcia-Luna-Aceves | |
| 2002/0169971 A1 | 11/2002 | Asano et al. | |
| 2003/0074413 A1 | 4/2003 | Nielsen et al. | |
| 2003/0103521 A1 | 6/2003 | Raphaeli et al. | |
| 2003/0105956 A1 | 6/2003 | Ishiguro et al. | |
| 2003/0140149 A1 | 7/2003 | Marejka et al. | |
| 2003/0145095 A1 | 7/2003 | Liu et al. | |
| 2003/0174690 A1 | 9/2003 | Benveniste | |
| 2003/0193394 A1 | 10/2003 | Lamb | |
| 2003/0235158 A1 | 12/2003 | Lee | |
| 2004/0013062 A1 | 1/2004 | Hino et al. | |
| 2004/0032847 A1 | 2/2004 | Cain | |
| 2004/0083385 A1 | 4/2004 | Ahmed et al. | |
| 2004/0100936 A1 | 5/2004 | Liu et al. | |
| 2004/0121792 A1 | 6/2004 | Allen et al. | |
| 2004/0151144 A1 | 8/2004 | Benveniste | |
| 2004/0185881 A1 | 9/2004 | Lee et al. | |
| 2004/0213270 A1 | 10/2004 | Su et al. | |
| 2004/0259563 A1 | 12/2004 | Morton et al. | |
| 2005/0036448 A1 | 2/2005 | Leeuwen | |
| 2005/0058151 A1 | 3/2005 | Yeh | |
| 2005/0086350 A1 | 4/2005 | Mai | |
| 2005/0129051 A1 | 6/2005 | Zhu et al. | |
| 2005/0152318 A1 | 7/2005 | Elbatt et al. | |
| 2005/0152378 A1 | 7/2005 | Bango et al. | |
| 2005/0243788 A1 | 11/2005 | Janczak | |
| 2005/0254453 A1 | 11/2005 | Barneah | |
| 2005/0259597 A1 | 11/2005 | Benedetto | |
| 2005/0271057 A1 | 12/2005 | Kim et al. | |
| 2006/0013154 A1 | 1/2006 | Choi et al. | |
| 2006/0023677 A1 | 2/2006 | Labrador | |
| 2006/0084444 A1 | 4/2006 | Kossi et al. | |
| 2006/0126535 A1 | 6/2006 | Sherman | |
| 2006/0128349 A1 | 6/2006 | Yoon | |
| 2006/0148516 A1 | 7/2006 | Reddy et al. | |
| 2006/0153157 A1 | 7/2006 | Roh et al. | |
| 2006/0227787 A1 | 10/2006 | Furlong et al. | |
| 2007/0008925 A1 | 1/2007 | Dravida et al. | |
| 2007/0019591 A1 | 1/2007 | Chou et al. | |
| 2007/0019594 A1 | 1/2007 | Perumal et al. | |
| 2007/0104096 A1 | 5/2007 | Ribera | |
| 2007/0110092 A1 | 5/2007 | Kangude et al. | |
| 2007/0124395 A1* | 5/2007 | Edge ..................... H04H 20/59 709/206 |
| 2007/0180533 A1 | 8/2007 | Ramaiah et al. | |
| 2007/0198731 A1 | 8/2007 | Li et al. | |
| 2007/0217346 A1 | 9/2007 | Zheng | |
| 2007/0259716 A1 | 11/2007 | Mattice et al. | |
| 2007/0259717 A1 | 11/2007 | Mattice et al. | |
| 2007/0263571 A1 | 11/2007 | Hermann et al. | |

(56) References Cited

U.S. PATENT DOCUMENTS

| | | |
|---|---|---|
| 2007/0265088 A1 | 11/2007 | Nakada et al. |
| 2007/0265089 A1 | 11/2007 | Robarts et al. |
| 2007/0266396 A1 | 11/2007 | Estermann |
| 2007/0283001 A1 | 12/2007 | Spiess et al. |
| 2007/0287437 A1 | 12/2007 | Cartmell |
| 2008/0015024 A1 | 1/2008 | Mullen |
| 2008/0039113 A1 | 2/2008 | Liu et al. |
| 2008/0058099 A1 | 3/2008 | Schwartz et al. |
| 2008/0080401 A1 | 4/2008 | Ribiere |
| 2008/0137624 A1 | 6/2008 | Silverstrim et al. |
| 2008/0144493 A1 | 6/2008 | Yeh |
| 2008/0147854 A1 | 6/2008 | Van Datta et al. |
| 2008/0159236 A1 | 7/2008 | Ch'ng |
| 2008/0163355 A1 | 7/2008 | Chu |
| 2008/0186206 A1 | 8/2008 | Reumerman |
| 2008/0192737 A1 | 8/2008 | Miyazaki |
| 2008/0262928 A1 | 10/2008 | Michaelis |
| 2008/0310439 A1 | 12/2008 | Gale et al. |
| 2009/0005140 A1 | 1/2009 | Rose et al. |
| 2009/0017913 A1 | 1/2009 | Bell et al. |
| 2009/0030605 A1 | 1/2009 | Breed |
| 2009/0041039 A1 | 2/2009 | Bear |
| 2009/0045977 A1 | 2/2009 | Bai et al. |
| 2009/0046628 A1 | 2/2009 | Hall |
| 2009/0073912 A1 | 3/2009 | Bauchot et al. |
| 2009/0122753 A1 | 5/2009 | Hughes et al. |
| 2009/0138353 A1 | 5/2009 | Mendelson |
| 2009/0175223 A1 | 7/2009 | Hall |
| 2009/0195401 A1 | 8/2009 | Maroney et al. |
| 2009/0201860 A1 | 8/2009 | Sherman et al. |
| 2009/0207783 A1 | 8/2009 | Choi et al. |
| 2009/0245518 A1 | 10/2009 | Bae et al. |
| 2009/0248420 A1 | 10/2009 | Basir |
| 2009/0298461 A1 | 12/2009 | O'Reilly |
| 2009/0323579 A1 | 12/2009 | Bai et al. |
| 2009/0325603 A1 | 12/2009 | Van Os et al. |
| 2010/0008259 A1 | 1/2010 | Yoon et al. |
| 2010/0029245 A1 | 2/2010 | Wood et al. |
| 2010/0042601 A1 | 2/2010 | Kelley et al. |
| 2010/0060480 A1 | 3/2010 | Bai et al. |
| 2010/0064307 A1 | 3/2010 | Malhotra et al. |
| 2010/0067451 A1 | 3/2010 | Hall |
| 2010/0069109 A1 | 3/2010 | Hall |
| 2010/0074234 A1 | 3/2010 | Banks et al. |
| 2010/0082513 A1 | 4/2010 | Liu |
| 2010/0128653 A1 | 5/2010 | Tateson |
| 2010/0150129 A1 | 6/2010 | Jin et al. |
| 2010/0162149 A1 | 6/2010 | Sheleheda et al. |
| 2010/0169009 A1 | 7/2010 | Breed et al. |
| 2010/0214987 A1 | 8/2010 | Mori |
| 2010/0215040 A1 | 8/2010 | Kappler et al. |
| 2010/0226342 A1 | 9/2010 | Colling et al. |
| 2010/0235633 A1 | 9/2010 | Asano et al. |
| 2010/0245124 A1 | 9/2010 | Bai et al. |
| 2010/0248618 A1 | 9/2010 | Bai et al. |
| 2010/0248843 A1 | 9/2010 | Karsten |
| 2010/0250106 A1 | 9/2010 | Bai et al. |
| 2010/0250346 A1 | 9/2010 | Bai et al. |
| 2010/0279776 A1 | 11/2010 | Hall |
| 2010/0287011 A1 | 11/2010 | Muchkaev |
| 2010/0304759 A1 | 12/2010 | Leppanen et al. |
| 2010/0329463 A1 | 12/2010 | Ratliff et al. |
| 2011/0002243 A1 | 1/2011 | Sherman et al. |
| 2011/0063116 A1 | 3/2011 | Lepley et al. |
| 2011/0081973 A1 | 4/2011 | Hall |
| 2011/0102459 A1 | 5/2011 | Hall |
| 2011/0105151 A1 | 5/2011 | Hall |
| 2011/0177829 A1 | 7/2011 | Platt et al. |
| 2011/0201369 A1 | 8/2011 | Kim et al. |
| 2011/0230202 A1 | 9/2011 | Wood et al. |
| 2011/0244887 A1 | 10/2011 | Dupray et al. |
| 2011/0299685 A1 | 12/2011 | Hall |
| 2012/0016940 A1 | 1/2012 | Hall |
| 2012/0058814 A1 | 3/2012 | Lutnick et al. |
| 2012/0079080 A1 | 3/2012 | Pishevar |
| 2012/0084364 A1 | 4/2012 | Sivavakeesar |
| 2012/0094770 A1 | 4/2012 | Hall |
| 2012/0108326 A1 | 5/2012 | Hall |
| 2012/0157210 A1 | 6/2012 | Hall |
| 2012/0329538 A1 | 12/2012 | Hall |
| 2013/0012231 A1 | 1/2013 | Hall |
| 2013/0099941 A1 | 4/2013 | Hall |
| 2013/0157692 A1 | 6/2013 | Hall |
| 2013/0242956 A1 | 9/2013 | Hall |
| 2014/0082369 A1 | 3/2014 | Waclawsky et al. |
| 2014/0098686 A1 | 4/2014 | Panta |
| 2014/0100027 A1 | 4/2014 | Harris et al. |
| 2014/0161006 A1 | 6/2014 | Hall |
| 2014/0247769 A1 | 9/2014 | Hall |
| 2014/0249749 A1 | 9/2014 | Hall |

OTHER PUBLICATIONS

Harris, RF-6920 C2CE-CNR Situational Awareness Application Brochure, downloaded from http:/ /rf. harris.com/media/R F-6920 tcm26-9172.pdf, Nov. 2008, 2 pages.

Kaplan, et al., "The Analysis of a Generic Air-to-Air Missile Simulation Model", NASA Technical Memorandum 109057, Jun. 1994, 48 pages.

Trivette, Sensor integration for the One Tactical Engagement Simulation System (One TESS), downloaded from http://vault.swri.org/cms/papers/3793 Presentation_2005 SensorsGov OneTESS.pdf, 2005, 28 pgs.

Aggarwal, Sudhir et al., "Accuracy In Dead Reckoning Based Distributed Multi-Player G ames", SIGCOMM '04 Workshops, (Proceedings of 3rd ACM SIGCOMM Workshop on Network and System Support for Games), Aug. 30-Sep. 3, 2004, Portland, Oregon, pp. 161-165.

Bjerver, Martin, "Player Behaviour in Pervasive Games—using the City as a Game Board in Botfighters", Master of Science Thesis, KTH Computer Science and Communication, Stockholm, Sweden, 2006.

bzflag(6):tank battle game—linux man page, Google date Feb. 1, 2001, downloaded from httQ://linux.die.net/man/6/bzflag.

de Souza e Silva, Adriana, "Alien revolt (2005-2007): A case study of the first location—based mobile game in Brazil", IEEE Technology and Society Magazine, Spring 2008, pp. 18-28.

Dialogic, "Adding location based services to existing architectures", Application Note: Location-Based Services, 9862-02, Oct. 2007, 14 pages, downloaded from http://www.dialogic.com/-/media/products/docs/signaling-and-ss7-components/9862_Add_Locationbased_Servs_an.pdf.

Gallagher, Sean, "Army prepares test of new wireless war game gear", Defense Systems, Jul. 7, 2008, downloaded from http://defensesystems.com/articles/2008/07/army-prepares-test-of-new-wireless-war-game-gear.aspx.

Halas, Jacek, "Ghost Recon: Advanced Warfighter Game Guide, [Mission 01] Contact! —Objective: Locate Ramirez with the Drone", 2007, downloaded from http://guides.gamepressure.com/ghostreconadvancedwarfighter/guide.asp?ID=986.

Hohfeld, Alexander, "In and out of reality: Janus-faced location awareness in ubiquitous games", Journal of Software, 2(6), Dec. 2007, 86-92.

Kim, Seong-Whan et al., "Kalman filter based dead reckoning algorithm for minimizing network traffic between mobile nodes in wireless GRID", Embedded and Ubiquitous Computing, Lecture Notes in Computer Science, 4096, 2006, 162-170.

MyCheats web page, "Ghost Recon: Advanced Warfighter Superguide, Reach Ramirez", (Jul. 19, 2006), downloaded from http://mycheats. 1up.com/view/section/3139558/18404/ghost_recon_advanced_warfighter/p c.

Santos, Nuno et al., "Vector-field consistency for ad-hoc gaming", Middleware 2007, LNCS 4834,2007, pp. 80-100.

Sotamaa, Olli, "All the world's a Botfighter Stage: Notes on location-based multi-user gaming", Proceedings of Computer Games and Digital Cultures Conference, Tampere University Press, 2002, pp. 35-44.

(56) References Cited

OTHER PUBLICATIONS

Ko et al., "Geocasting in Mobile Ad Hoc Networks: Location-based Multicast Algorithms", Technical Report TR-98-018 Texas A&M University, Sep. 1998, 10 pages.
Ko, et al., "Flooding-Based Geocasting Protocols for Mobile Ad Hoc Networks," Mobile Networks and Applications, Dec. 2002, 7, 471-480.
Hall, "Cheating Attacks and Resistance Techniques In Geogame Design," Proc. 2010 ACM FuturePlay Symposium, 2010, 82-89.
Hall, "An Improved Geocast for Mobile Ad Hoc Networking," IEEE Transactions on Mobile Computing, 2010, 1-14.
Balasubramaniam, et al. "Interactive WiFi Connectivity for Moving Vehicles," Proceedings of SIGCOMM, Aug. 17-22, 2008, 12 pages.
German Aerospace Center, Simulation of Urban Mobility, 2010, http://sumo.sourceforge.net., 1 page.
Hadaller, et al., "Vehicular Opportunistic Communication Under the Microscope," Proceedings of MobiSys, Jun. 11-14, 2007, 206-219.
Heissenbuttel, et al., "BLR: Beacon-Less Routing Algorithm for Mobile Ad-Hoc Networks," Elsevier's Computer Communications Journal, 27, 2003, 15 pages.
Hall, et al., "A Tiered Geocast Protocol for Long Range Mobile Ad Hoc Networking," Proceedings of the 2006 IEEE Military Communications Conf., 2006, 8 pages.
Hull, et al., "CarTel: A Distributed Mobile Sensor Computing System," Proceedings of ACM SenSys, Nov. 2006, 14 pages.
Eriksson, et al., "Cabernet: Vehicular Content Delivery Using WiFi," Proceedings of Mobicom, Sep. 2008, 12 pages.
Karp, et al, "GPSR: Greedy Perimeter Stateless Routing for Wireless Networks," Proceedings of Mobicom, 2000, ACM 2000, 12 pages.
Kuhn, et al., "Geometric Ad-Hoc Routing: of Theory and Practice," Proc. 2003 Symposium on Principles of Distributed Computing, ACM 2003, 10 pages.
Lee, et al., "Efficient Geographic Routing in Multihop Wireless Networks," Proc. MobiHoc 2005, ACM, 2005, 12 pages.
Niculescu, et al., "Trajectory Based Forwarding and Its Applications," Proc. Mobicom 2003, ACM, 2003, 13 pages.
Ns-2, "The Network Simulator," 2010, http://isi.edu/nsnam/ns, 2 pages tilisi.edu/nsnam/ns, 2 pages.
Shevade, et al., "Enabling High-Bandwidth Vehicular Content Distribution," Proceedings of CoNEXT 2010, Nov. 30-Dec. 3, 2010, 12 pages.
Yassein, et al., "Performance Analysis of Adjusted Probabilistic Broadcasting In Mobile Ad Hoc Networks," Proc. 11th Inti. Conf. on Parallel and Distributed Systems Workshops, 2005, 27 pages.
Zorzi, et al., "Geographic Random Forwarding (GeRaF) for Ad Hoc and Sensor Networks: Multihop Peformance," IEEE Transactions on Mobile Computing, Dec. 2003, 11 pages.
Social +Gaming—SWiK: http://swik.net/social+gaming, 2009.
Schutzberg, "Phone-based GPS-based Games: Missing Pieces"; http://www.directionsmaa.com/articleoho?article id=939 Aug. 17, 2005.
Corbett, Derek J., and David Everitt, "A Partitioned Power and Location Aware MAC Protocol for Mobile Ad Hoc Networks," Technical Report No. 553 (University of Sydney, School of Information Technologies), Jul. 2004.
Shih, K.-P, "A Collision Avoidance Power Control MAC Protocol for Wireless Ad Hoc Networks", Communication Letter, Sep. 9, 2005, 9, 859-861.
Liao, W.-H, et al., "GRID: A Fully Location-Aware Routing Protocol for Mobile Ad hoc Networks," Telecommunication Systems, Klumar Academic Publishers, 2001, 18, 1-26.
Conti, M., "Body, Personal, and Local Ad Hoc Wireless Networks", in The Handbook of Ad Hoc Wireless Networks, M. Ilyas, Ed. Boca Raton: CRC Press, 2002, Chapter 1.
Ilyas, Ad Hoc Wireless Networks, CRC Press, Chapter 1, 2003, 22 pages.

Manvi, et al., "Performance Analysis of AODV, DSR, and Swarm Intelligence Routing Protocols in Vehicular Ad Hoc Network Environment," Proceedings of IEEE Future Computer and Communications, Apr. 2009, 21-25.
Tseng, Y.-C, et al., "Fully Power-Aware and Location-Aware Protocols for Wireless Multi—hop Ad Hoc Networks", Proc. of IEEE Inti. Conference on Computer Communications and Networks (ICCCn), 6 pgs., 2002.
Various Authors, The Wikipedia page for the "snake" computer game, Nov. 3, 2008 version, Wikipedia.com, downloaded by the USPTO from http://en.wikipedia.org/w/index.php?title=Snake_(video_game)&oldid=249370716 on Oct. 4, 2012.
Winkler, Additional date evidence for the Ars Electronica organization archive document http://archive.aec.at/submission/2004/U19/1043/, retrieved from http://web.archive.org/web/20050508084628/http://www.aec.aUen/archives/prix_archive/prix_project.asp?iProjectID=12899.
Winkler, The computer game "GPS::Tron", as evidenced by the Ars Electronica organization archive document http://archive.aec.at/submission/2004/U19/1043/, where the document has an earliest archive.org verified publication date May 4, 2005, pp. 1-2.
"Boost Mobile Introduces first Location-based, GPS games in US" http://www.physorg.com/news5824.html, Aug. 16, 2005.
Location-Enabled Mobile Gaming; sites/lbsglobeflbs/applications/mobilehttp://www.nn4d.com/site/global/market/affiliate_sites/lbsapplications/mobilegaming.jsp (2007).
Location-Enabled Mobile Gaming; http://www.nn4d.com/site/global/market/affiliate.
"Sony bigwig hints at GPS-enabled PSP games": http//:www.vespacious.com/sony-bigwig-hints-at-gps-enabled-psp-games.html, Dec. 22, 2008.
Das, et al., "Spawn: A Swarming Protocol for Vehicular Ad-Hoc Wireless Networks," Proceedings of 181 ACM Vanet, Oct. 2004, 2 pages.
Gupta, et al., "The Capacity of Wireless Networks," IEEE Transactions on Information Theory, 46(2), Mar. 2000, 17 pages.
Hall, "RTEQ: Modeling and Validating Infinite-State Hard-Real-Time Systems", AT&T Labs Research, ASE 2007, Nov. 2007, 4 pages.
Hallet al., "A Two-Level Quality of Service Scheme for Collision based on Mobile Ad Hoc Networks", IEEE, 1-4244-1513-06/07,2007, 8 pages.
http://askville.amazon.com/Wii-games-play-1nternet-Family/AnswerViewer.do?requestId=6796582, 2007.
Lee, et al., "CarTorrent: A Bit-Torrent System for Vehicular Ad-Hoc Networks," Mobile Networking for Vehicular Environments, Sep. 2007, 6 pages.
Lindo, Wayne A. et al., "Network modeling and simulation in the OneTESS program", Fall Simulation Interoperability Workshop 2006, Orlando, Florida, USA, Sep. 10-15, 2006, 155ff.
Maihofer, "A Survey OfGeocast Routing Protocols," IEEE Communications Surveys, Jun. 2004, 32-42.
Ni, et al., "The Broadcast Storm Problem in a Mobile Ad Hoc Network," Proceedings of the 5th Annual ACM/IEEE International Conference on Mobile Computing and Networking, ACM, 1999, 151-162.
Nicklas, Daniela, and Bernhard Mitschang. "On building location aware applications using an open platform based on the Nexus Augmented World Model." Software and Systems Modeling 3.4, 2004, 303-313.
Nintendo, The computer game "Mario Kart DS", released in North America on Nov. 14, 2005, published by Nintendo, as evidenced by the game FAQ by Alex, downloaded from http://db.gamefaqs.com/portable/ds/file/mario_kart_ds_h.txt, with a game FAQ reported upload date of Jul. 15, 2007, p. 11.
Panta, "GeoV2V: Vehicular Communications Using a Scalable Ad Hoc Geocast Protocol," AT&T Labs Research, Nov. 2011, 14 pages.
Schwingenschlogl, "Geocast Enhancements of AODV for Vehicular Networks," ACM SIGMOBILE Mobile Computing and Communications Review, Jun. 2002, 18 pages.

(56) References Cited

OTHER PUBLICATIONS

Shih, K.-H, "A Distributed Slots Reservation Protocol for QoS Routing on TDMA-Based Mobile Ad Hoc Networks", Networks (ICON 2004) Proceedings 12th IEEE Inti Conference, 2004, 2, 660-664.
Steve:"GPS-enabled Cell Phone Games" http://www.strangenewproducts.com/2005/08/gps-enabled-cell-phone-games.html, Aug. 15, 2005.
Zahn, et al., "Feasibility of Content Dissemination Between Devices in Moving Vehicles," Proceedings of CoNEXT 2009, Dec. 1-4, 2009, 11 pages.

* cited by examiner

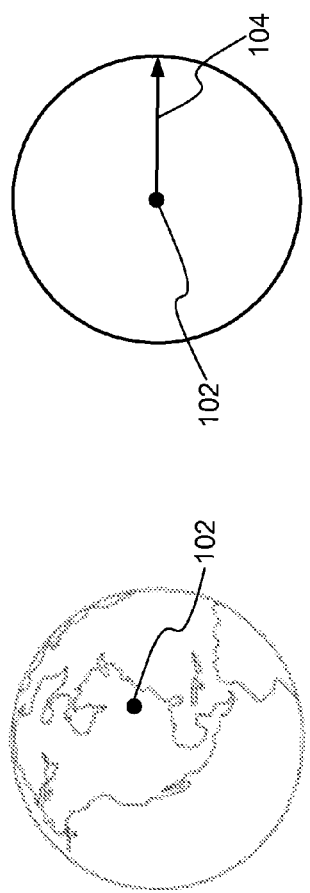
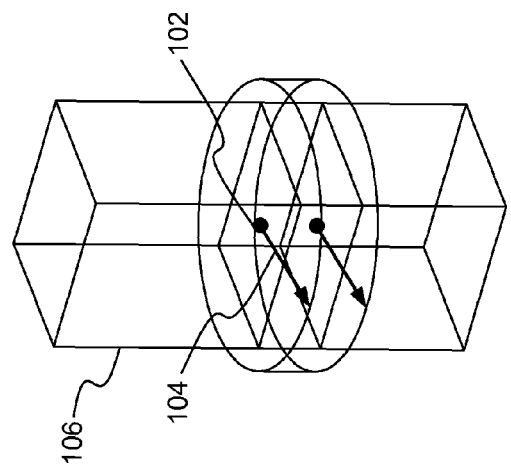
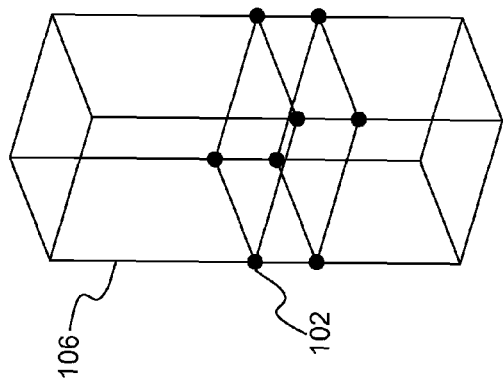
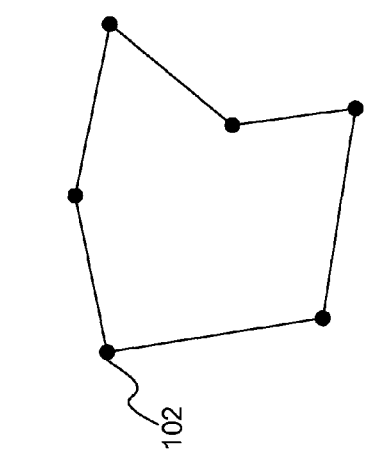

CAMPUS ALERTING VIA WIRELESS GEOCAST

CROSS REFERENCE TO RELATED APPLICATIONS

The instant application is a continuation application of, and claims priority to, U.S. patent application Ser. No. 13/890,423, filed May 9, 2013. U.S. patent application Ser. No. 13/890,423 is a continuation of, and claims priority to, U.S. patent application Ser. No. 12/643,346, filed Dec. 21, 2009, which issued on Jul. 9, 2013, with U.S. Pat. No. 8,483,652. U.S. patent application Ser. No. 12/643,346 claims priority to U.S. provisional patent application No. 61/258,167, filed Nov. 4, 2009. U.S. patent application Ser. No. 13/890,423 is incorporated herein by reference in its entirety. U.S. patent application Ser. No. 12/643,346 is incorporated herein by reference in its entirety. U.S. provisional patent application No. 61/258,167 is incorporated herein by reference in its entirety. U.S. Pat. No. 8,483,652 is incorporated herein by reference in its entirety.

BACKGROUND

Typical approaches to alerting individuals in a particular geographic area, for example campus alerting at a college or university, involve sending generic broadcast alerting messages pertaining to an emergent situation. For example, a broadcast message might be sent to all subscribers to a campus alerting system. Such a message might contain generic information or instructions pertaining to an emergent situation taking place somewhere on the campus. This type of alerting, however, has several shortcomings. For example, in a campus alerting scenario, the alerting message may not reach all persons who may be affected, such as visitors, attendees at a campus sporting event, or other non-subscribers. Further, sending a generic message to all subscribers may cause needless panic, for example alerting subscribers at a crowded sporting event when the emergent situation is occurring in a remote area distant from the sports stadium. Delivering a generic message might also put innocents in harm's way, for example if an alerting message describing an escape route was delivered to a terrorist holding hostages, thereby facilitating cutoff of the escape route. Additionally, broadcast alerting systems are costly, both in terms of the overhead involved in maintaining lists of subscribers, and in terms of the network resources consumed. Large scale broadcasts may overburden network components, resulting in failed delivery or message loss.

SUMMARY

Wireless geocast alerting allows delivery of customized alerting messages to particular geographic areas. Alerting messages can be delivered to ad hoc networks of mobile devices within particular geographic areas via a geocast transmission protocol. Such ad hoc mobile networks are distributed and scalable, enabling alerting messages to propagate between mobile communications devices without the use of traditional network components. Pre-subscription to an alerting service is not required, thereby eliminating the concern that some individuals will not receive alerting messages. Alerting messages can be transmitted to particular geographic areas, and can contain distinct messaging content appropriate to each particular area (e.g., information and/or instructions), thereby mitigating the chances of creating unnecessary panic and/or alerting individuals who should not receive alerting messages. The content of alerting messages can also be made up of distinct portions of content. Each portion of content can be tailored based on one or more conditions. Subsequent alerting messages containing updates may be provided as an emergent situation changes with time.

BRIEF DESCRIPTION OF THE DRAWINGS

FIGS. 1A-1E depict example techniques that may be used for defining the shape and/or dimensions of geocast alerting regions.

DETAILED DESCRIPTION OF ILLUSTRATIVE EMBODIMENTS

Figure 2:
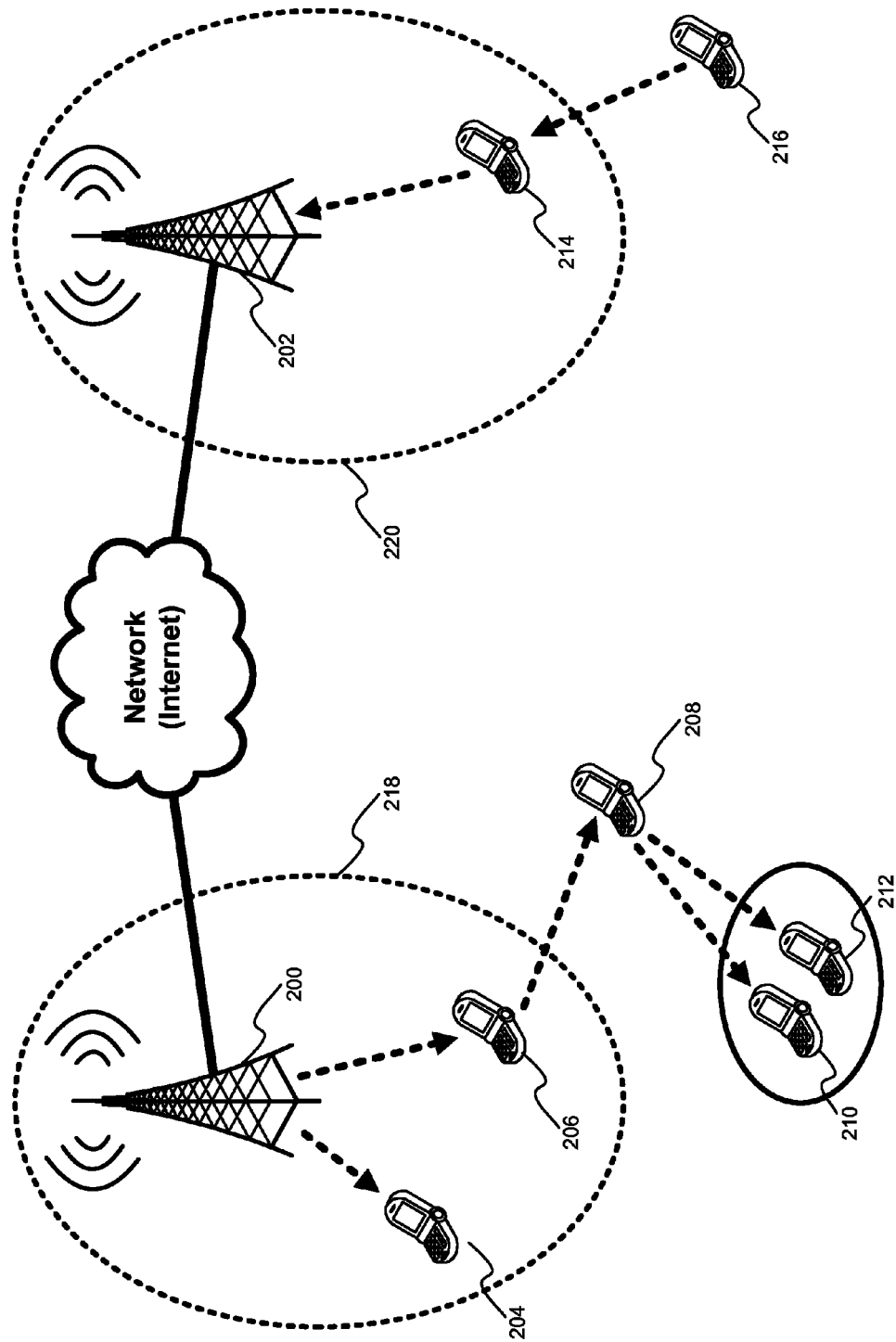
FIG. 2 illustrates communication in an ad hoc network via WiFi access points.

Customized alerting information may be received and rendered by a mobile communications device based on the location of the mobile device and/or a condition associated with the mobile device, for example whether the device is stationary or moving, and if moving, the direction and/or speed of movement. For example, alerting messages containing specific warnings and/or instructions can be delivered to mobile communications devices located in the immediate geographic area of an emergent situation, while different alerting messages and/or instructions can be delivered to mobile communications devices at nearby geographic locations where the mobile device operators are not in imminent danger. Alerting message content may be further distinguished based on a condition of a mobile communications device. For example, the alerting message content rendered by a mobile communications device may depend on a direction of movement (e.g., towards or away from the danger area), and the speed at which the communications device is moving. Subsequent alerting messages specific to different geocast alerting regions may be transmitted based on trends or developments in the emergent situation over time. Geocast alerting regions may be pre-defined, but can also be determined dynamically or in real-time. Boundaries of geocast alerting regions may be defined via automatic or user-driven processes, or a combination thereof.

In the embodiments described herein, customized alerting messages may be provided to mobile devices in distinct geographic areas via geographical broadcasting, referred to as geocasting. Geocasting is described in U.S. Pat. No. 7,525,933, entitled "System And Method For Mobile Ad Hoc Network," filed Nov. 30, 2005, issued Apr. 28, 2009, which is incorporated by reference herein in its entirety. Geocasting uses a protocol in which an IP address is replaced with a geographic address. Generally, geocast alerting message packets are sent to every mobile communications device located within a specific geocast alerting region. A geocast alerting region generally corresponds to a specific geographic area. Each geocast alerting message packet may contain an indication of a destination geocast region for the alerting message and alerting message content. A geocast alerting message packet may also contain an indication of the location of the sender of the alerting message. Mobile communication devices participating in geocast messaging may be referred to collectively as a geocast ad hoc network. No registration is required for a mobile communications device to join a geocast ad hoc network. As mobile communications devices move within communications range of members of a geocast ad hoc network, they can automatically participate in the geocast ad hoc network. The mobile communication devices of an ad hoc network communicate with each other, and each mobile communications device in the ad hoc network is capable of receiving and/or transmitting geocast alerting message packets to and/or from other communications devices in the ad hoc network of mobile communications devices. Ad hoc networks of mobile communication devices do not require base station terminals or other network components to facilitate or control communications between the mobile communications devices. However, in some embodiments, base stations and/or other network components may be used to relay and/or bridge geocast messages between geocast ad hoc networks or between geocast ad hoc networks and other networks, for example the Internet.

A mobile communications device that receives geocast packets may redistribute the geocast packets to other mobile communications devices according to heuristic decision rules that determine whether a receiving communications device will re-transmit a received packet. These rules effectively guide geocast packets to their destinations and control communication traffic within the ad hoc network. The decision rules achieve this control by using statistics obtained and recorded by the communications device as it receives packets transmitted within its reception range. This distributed packet transfer mechanism results in geocast packets "flowing" to and throughout the geocast region specified in each geocast packet. The communications devices in the geocast region receive and process each distinct geocast packet, and may render the content of the geocast packet to the user via a user interface of the communications device. Two geocast packets are distinct if they contain distinct geocast identifiers. However, a retransmitted copy of a packet generally will contain the same geocast identifier as the original packet.

In an example embodiment applying heuristic decision rules, a receiving communications device may determine whether to retransmit a geocast message packet based upon the number of times the geocast message was previously received, the communication device's proximity with respect to the communications devices from which the message was sent, and/or the communication device's proximity to the geocast region. This decision process may be implemented as a three step location-based approach, which is described in detail in the aforementioned U.S. Pat. No. 7,525,933, entitled "System And Method For Mobile Ad Hoc Network," filed Nov. 30, 2005, issued Apr. 28, 2009. In a first step of the location-based approach, the receiving communications device determines whether it has previously received the same geocast message at least a predetermined number (N) of times. If not, it retransmits the message over the ad hoc network of communications devices. If so, the communications device progresses to the second step and determines whether the sending communications device is closer than some minimum distance away. If no prior sender of the geocast message was closer than the minimum distance away, the communications device retransmits the geocast message to the ad hoc network of communications devices. Otherwise, the communications device progresses to the third step and determines whether it is closer to the center of the geocast region than any sending communications device from which the geocast message was received. If so, the communications device transmits the geocast message over the ad hoc network of communications devices. If not, the communications device does not retransmit the geocast message.

This location-based approach prevents a receiving communications device from retransmitting a geocast message that was most likely already retransmitted by another communications device located close to it (and thus most likely reaching the same neighboring communications devices that it can reach). In addition, this location-based approach reduces the chance that the communications device will retransmit the same geocast message multiple times to the same neighboring communications devices.

While transmission and propagation of alerting messages are described herein with reference to embodiments using a particular scalable wireless geocast protocol, the scope of the instant disclosure should not be limited thereto. It is to be understood that the methods and apparatuses for distributing alerting messages as described herein may be implemented in conjunction with other geographic broadcast protocols, and that the use of such other geographic broadcast protocols is meant to be included within the scope of the instant disclosure.

FIGS. 1A-1E depict example techniques for defining geocast regions. A geocast region may be defined to be a single point 102, as depicted in FIG. 1A. A point geocast region may be defined by a longitude value and a latitude value (not shown). A point above the surface of the earth could be defined by providing an altitude value in addition to longitude and latitude values. A geocast region may also be comprised of multiple single points (not shown) such as the single point 102. Location points such as point 102 may be used as the building blocks for more complex geocast region geometries, as described herein. FIG. 1B depicts a geocast region defined by a point 102 in combination with a radius 104. The geocast region of this example will comprise the area enclosed by the radius, and may include the space above the area as well. A geocast region could also be defined as the overlap region between two or more circular geocast regions (not shown). FIG. 1C depicts a more complex geometry formed from a series of points 102 interconnected with straight boundary lines. This technique of geocast region definition is similar to the techniques typically used in the definition of parcels of real property. FIGS. 1D and 1E depict the creation of one or more geocast regions within a single geographic footprint. FIG. 1D depicts creating a geocast region for a specific floor of a building 106. The single floor geocast region is defined as the volume of space between upper and lower areas, each formed using a series of points 102 set at corners of the buildings. FIG. 1E depicts an alternate technique for defining a single floor geocast region in building 106. Upper and lower points 102 are defined in the middle of the ceiling and the floor of the geocast region respectively. The single floor geocast region is then defined as the volume of space between an upper area and a lower area defined by a pair of radii 104 extending from the middle points. Geocast regions may also be defined to change in size, geographic location, etc. with time (not shown), essentially allowing the creation of geocast alerting regions in four dimensions. For example a geocast alerting region corresponding to a dangerous weather system may be defined to change size, shape, and/or geographic location to provide location specific geocast alerting messages as the weather moves over time. Information defining a particular geocast region (e.g., a series of points) can be communicated in an addressing portion of a geocast alerting message. Geocast sub-regions may be defined within a particular geocast region using the above techniques. It should be noted that the techniques described with reference to FIGS. 1A-1E are merely examples, and the scope of the instant disclosure should not be limited thereto. Other alerting region geometries and techniques for defining geocast alerting regions may be recognized by those skilled in the art, and are meant to be included within the scope of the instant disclosure.

FIG. 2 illustrates communication in an ad hoc network of communications devices via WiFi access points 200 and 202. Communications devices in a geocast ad hoc network can communicate via RF signals encoded with geographic information, via Bluetooth® technology, via WiFi (e.g., in accordance with the 802.11 standard), or the like, or any combination thereof. For example, as depicted in FIG. 2, mobile communications devices 204, 206, 208, 210, and 212 form one geocast ad hoc network and mobile communications devices 214 and 216 form another geocast ad hoc network. Coverage area 218, which is the area covered by the WiFi access point 200, covers the mobile communication devices 204 and 206. Coverage area 220, which is the area covered by the WiFi access point 202, covers the mobile communication device 214. As shown in FIG. 2, the mobile communications device 216 transmits to the mobile communications device 214 directly (e.g., via Bluetooth®). The mobile communications device 214 retransmits to the WiFi access point 202, which in turn retransmits to the WiFi access point 200 over a network, for example the Internet. The mobile communications devices 204 and 206 receive the transmission from the WiFi access point 200, and the mobile communications device 206 retransmits directly to the mobile communications device 208. And, as depicted, the mobile communications device 208 retransmits to the mobile communications devices 210 and 212.

Figure 3:
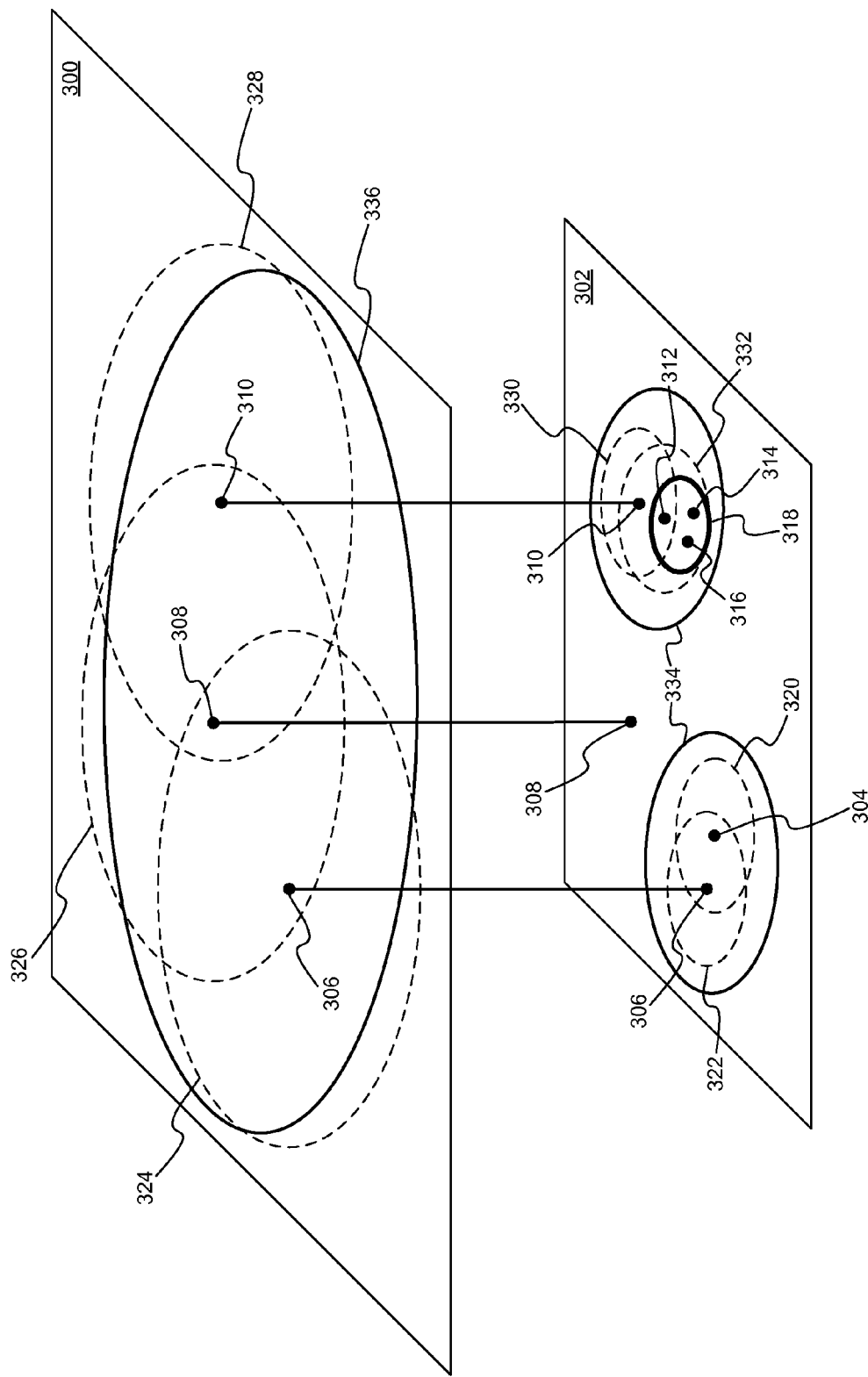
FIG. 3 illustrates tiered geocasting and forwarding zones.

FIG. 3 illustrates tiered geocasting and forwarding zones. Tiered geocasting extends the reach of ad hoc communication networks through the use of long range transmitters (such as communications devices, etc.), infrastructure, a communications network, a cellular tower, or a combination thereof, when available. Tiered geocasting may enable geocast alerting messages to be transmitted between mobile communications devices separated by distances beyond the broadcast range of typical mobile communications devices. Tiered geocasting assumes that at least one communications device within an ad hoc network is capable of communicating via a long range tier 300. A long range tier is a term indicating a tier wherein characteristic message transfers between devices occur over a longer physical range than those over some other tier, such as a short range tier 302. A long range tier can be wireless, wired, or a combination thereof.

A forwarding zone can be utilized to implement tiered geocasting. A common forwarding zone can be defined for all geocast packets or different forwarding zones can be defined for different types of geocast packets. Forwarding zones (as depicted in FIG. 3 by short and long range forwarding zones 334 and 336 respectively, for example and without limitation) can be defined differently in different tiers for a single packet type, or even on a packet by packet basis. Thus, forwarding heuristics can be applied independently per tier, with bridging at multi-tier capable nodes. In an example embodiment, a communications device retransmits a packet only if the communications device is located within the forwarding zone defined for the packet's type. This determination is in addition to the determinations described above and, if the communications device is not in the forwarding zone, the packet will not be retransmitted, even if one or more of the above conditions would otherwise have caused a retransmission hold.

As depicted in FIG. 3, nodes (e.g., communications devices) 304, 306, 308, 310, 312, 314, and 316, are at various locations within the short range tier 302 and the long range tier 300. All of communications devices 304, 306, 308, 310, 312, 314, and 316 together form a geocast ad hoc network. The communications devices 312, 314, and 316 are located in geocast region 318. In an example embodiment, the communications device 304 may transmit a geocast message with a destination address of the geocast region 318. Each of the communications devices 304, 306, 308, 310, 312, 314, and 316 can determine its own geographic location through any type of location determination system including, for example, the global positioning system (GPS), assisted GPS (A-GPS), time difference of arrival calculations, configured constant location (in the case of nonmoving nodes), any combination thereof, or any other appropriate means. Each communications device is operable to transmit and receive geocast packets via the geocast ad hoc network. In addition, at any given time, some subset (possibly all) of the communications devices may be operable to transmit and receive geocast packets over the long range tier 300 network. For example, though not a limitation, in FIG. 3, the communications devices 306, 308, and 310 can transmit and receive geocast messages over both the short range tier 302 and the long range tier 300. Note that this latter fact is indicated visually in the diagram by the communications devices 306, 308, and 310 each being represented by two nodes (one in the short range tier and one in the long range tier) connected by a vertical line. The long-range tier 300 network can be any network in which packets can be transmitted from one long range capable communications device to another long range capable communications device. Such packet networks can include, for example, an infrastructure-based network comprising wireless base stations (for up- and down-link) operating on a separate frequency from that used by the ad hoc network. In addition, the long rang tier network also could be implemented simply as another instance of an ad hoc communications network using distinct radio frequencies and possibly longer radio ranges.

The communications device 304 transmits, within its communication range 320, a geocast message addressed to the geocast region 318, and the communications device 306, located within the communications range 320 of the communications device 304, receives the transmission. The communications device 306 may retransmit the message, within its communications range 322 on the short range tier 302, in accordance with the heuristics for the short range forwarding zone 334. The communications device 306, with long range transmission capability (in the long range tier 300), may simultaneously retransmit the message within its communication range 324 on the long range tier 300. The communications device 308, configured for long range communications only and located within the communications range 324 of the communications device 306, receives the transmission from the communications device 306 and may retransmit the message within its communication range 326 on the long range tier 300. The communications device 310, located within the communication range 326 of the communications device 308, receives the transmission from the communications device 308 and may retransmit the message in both its communication range 328 on the long range tier and its communication range 330 on the short range tier. The communications device 312, a member of the geocast region 318 and located within the communication range 330 of the communications device 310, receives the transmission from the communications device 310 and may retransmit the message within its communication range 332 on the short range tier, thus transmitting the geocast message to the communications devices 314 and 316, the other members of geocast region 318, thereby completing the geocast message transmission.

Figure 4:
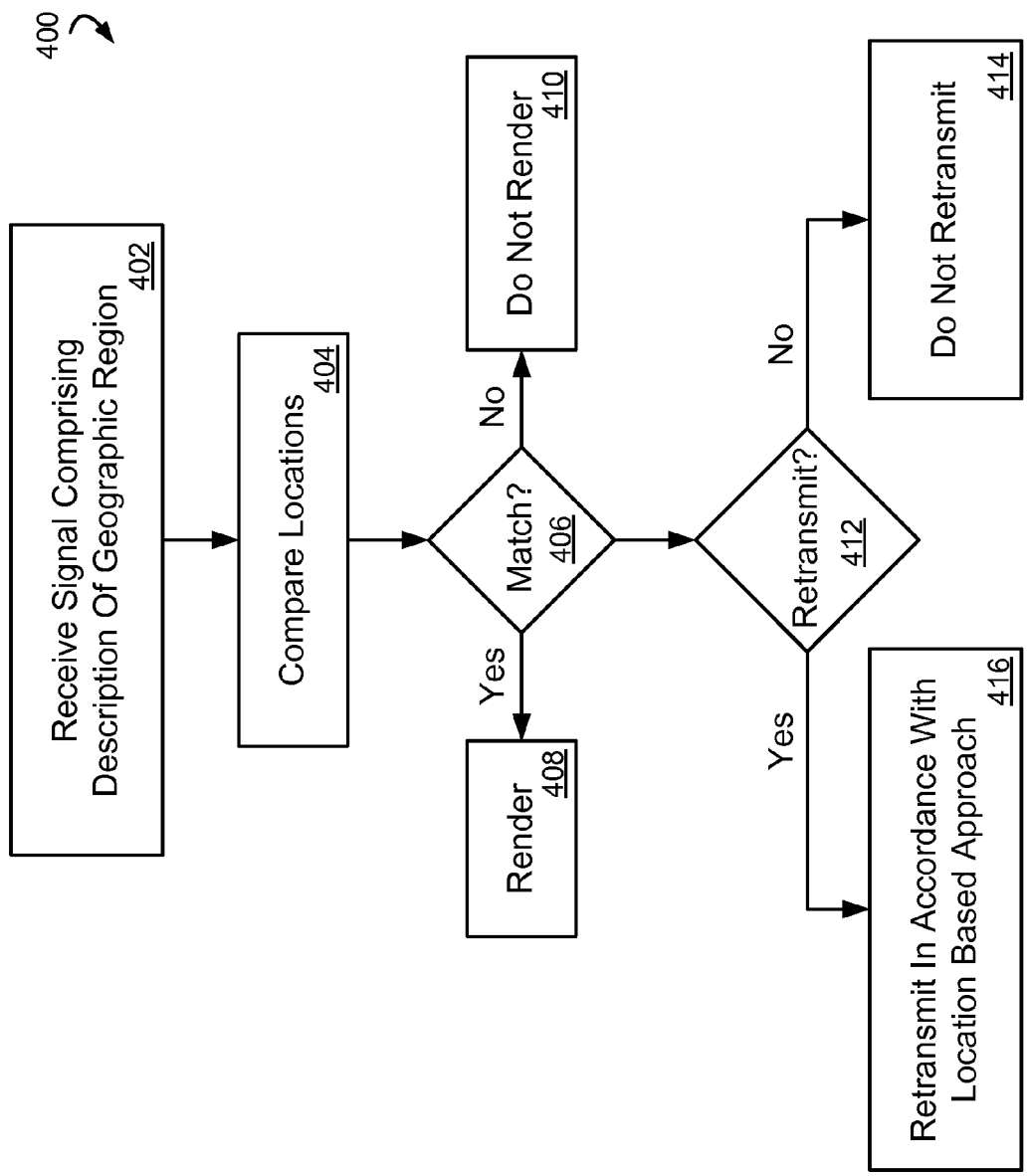
FIG. 4 is a flow diagram depicting an example process for providing an alerting message, or the like, via geocasting.

FIG. 4 is a flow diagram 400 of an example process for providing an alerting message, or the like, via geocasting. A signal is received at step 402. The signal comprises a description of the geographic region of intended reception of the signal. The signal can be received by any appropriate communications device, such as a mobile communications device, for example. At step 404, the current location of the communication device is compared with the location of the geographic region of intended reception. It is determined, at step 406 if the locations match. That is, it is determined if the location of the receiving communications device is the same as, within, or overlaps, the location of the geographic region of intended reception. If the locations do not match, content of the message is not rendered at step 410. If the locations match, appropriate content (e.g., alerting message content) of the message is rendered, at step 408, via the receiving communications device. At step 412, it is determined if the message is to be retransmitted by the receiving communications device. If, at step 412, it is determined that the message is not to be retransmitted, the message is not retransmitted at step 414. If, at step 412, it is determined that the message is to be retransmitted, the message may be retransmitted at step 416, if appropriate, for example in accordance with the above-described location-based approach.

In an embodiment, multiple geocast alerting regions may be created and managed by a single alerting system interface. Separate geocast alerting regions may be defined using any one of the above-discussed techniques or a combination thereof. A geocast alerting region can be defined in communications among members of an ad hoc geocast network within the geocast alerting region. For example, information describing a geocast alerting region (e.g., location, size, shape, coordinates, range of coordinates, etc.) can be contained in packets communicated among the members of the ad hoc network. The information could vary from packet to packet, vary as a function of time (e.g., the boundaries of the geocast alerting region may be redefined as the status of an emergent situation changes with time), and/or predetermined and fixed prior to communications between members of the ad hoc network.

Geocast alerting regions may be defined manually, for example by a user interacting with an alerting system interface. Alternatively, definition of geocast alerting regions may be automated, for example with the use of mapping software. Geocast alerting regions may also be defined using a combination of automated and manual processes. One or more sets of default geocast alerting regions may be maintained by the alerting system. Each default set of geocast regions may be associated with a particular type of emergent situation, for example fire, earthquake, shooting, hostage situation, severe weather, bomb threat, chemical attack, and the like. The alerting system may be configured to automatically distribute alerting messages to corresponding geocast regions when a default (i.e., predefined) emergent situation occurs, or the system may be triggered manually through user interaction. A combination of manual and automatic triggers may also be used. The content of alerting messages transmitted during a default alerting process may be predetermined in accordance with the default geocast regions and/or the type of emergent situation, or may be determined in real-time as alerting messages are transmitted.

Geocast regions may be redefined or otherwise modified when appropriate. Geocast region modifications can be entered manually by a user, can be auto-generated by the alerting system through a set of predefined criteria, or may be entered using a combination of techniques. Pre-defined geocast alerting regions, for example default alerting regions, can be redefined or otherwise modified when the alerting system is not activated, or may be modified dynamically in real-time while the alerting system is activated. For example, geocast regions may be modified based on trends or developments in an emergent situation, the surrounding geographic area, and the like. The content of alerting messages transmitted to a particular geocast alerting region may be determined coincidentally with modification of that geocast region. Geocast alerting regions may also be configured with dynamic behavior at the time they are defined. In an embodiment, for example, a dynamic geocast alerting region may be defined to comprise an initial geographic region for a given interval of time. The geocast region may be defined such that the alerting region dynamically changes after the initial interval of time expires. Dynamic changes might include translation of the geocast alerting region to a subsequent geographic location, varying its size and/or shape, and the like. The dynamic changes may be: implemented according to a predetermined scheme; determined and implemented by the alerting system in real-time according to new information and/or feedback into the alerting system, or the like; or a combination thereof.

Figure 5:
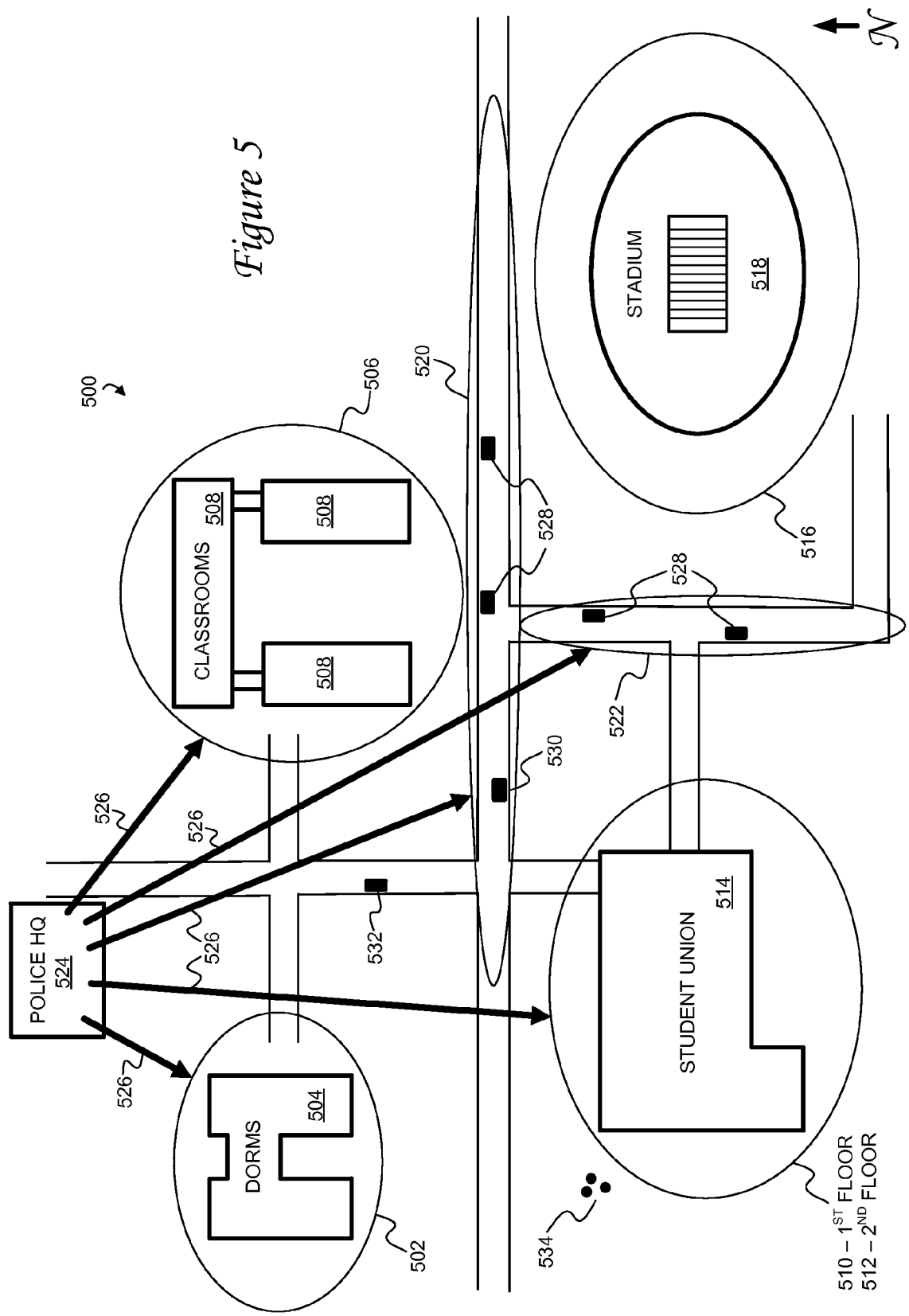
FIG. 5 depicts an example of providing customized alerting messages via geocast alerting.

FIG. 5 depicts an example of a geocast alerting system, in particular an alerting system for alerting mobile communication devices on a college or university campus. The example campus 500 comprises a series of buildings and roads. It is to be understood that the campus layout depicted, including the type, number, and placement of buildings, roads, and other features is merely exemplary and not to be construed as limiting structure or function, and that the systems and methods disclosed herein may be applied to any physical arrangements of buildings, roads, infrastructure, and the like. Additionally, it is to be understood that the depiction of a campus is exemplary and not intended to be limiting. Other environments suitable for deployment of geocast alerting include a metropolitan area disaster site, a battlefield, a campground, etc.

Separate geocast alerting regions are defined for discrete areas of campus 500. It is to be understood that the geocast alerting regions depicted in FIG. 5, including the number, size, shape, and geographic location of the alerting regions is merely exemplary and not to be construed as limiting structure or function. A first geocast alerting region 502 is defined for a dormitory facility 504. Greater granularity in the definition of alerting regions for the dormitory facility 504 is possible, for example separate alerting regions could be defined for each floor of the dormitory. But, for the sake of simplicity, a single geocast alerting region 502 serves to distribute alerting messages among all mobile communications devices within the building. A second alerting region 506 is defined for a complex of interconnected classroom buildings 508. Again, multiple alerting regions or alerting sub-regions could be defined within this complex, for example separate alerting regions for each floor, for each wing of classrooms, or even on a classroom by classroom basis if desired, but a single alerting region is depicted for the sake of simplicity. Two separate geocast alerting regions 510 and 512 are defined for the student union building 514. The student union building 514 comprises two floors, with alerting regions 510 and 512 defined for the first and second floors respectively. A single alerting region 516 has been defined for the campus sports stadium 518, although multiple alerting regions or alerting sub-regions are possible. Although FIG. 5 depicts independent geocast alerting regions, it would also be possible to define a "master" geocast alerting region encompassing the entire geographic area of the campus. A master geocast region would be advantageous for simplified distribution of alert messages that pertain equally to all individuals located on campus, for example an alert message pertaining to a weather event. Individual geocast alerting sub regions, covering distinct geographic areas of the campus, for example the alerting regions 502, 506, 510, 512, and 516, may be defined (i.e., carved out) within the master alerting region. The alerting system may be configured to send alerting messages to the master region, one or more of the sub regions, or any combination thereof.

The creation of geocast alerting regions is not limited to physical structures such as buildings. Campus alerting regions have also been defined for roads traversing the campus, in particular alerting region 520 for the road running east to west along the north side of the stadium 518 and alerting region 522 for the road running north to south along the west side of the stadium 518. It should be noted that the creation of geocast alerting regions is not limited to buildings, roads, and the like. The locations, geometries, etc. of the geocast alerting regions depicted in FIG. 5 are merely exemplary and not to be construed as limiting structure or function.

In an example of an emergent situation for which the geocast campus alerting system may be used, a terrorist attack on the first floor of the student union building 514 has resulted in a hostage situation. The police 524 receive notice of the emergent situation (not shown) and activate the geocast campus alerting system in order to transmit alerting messages. The geocast alerting system may be secured to prevent transmission of fraudulent and/or unauthorized geocast alerting messages. In an embodiment, control over the creation and/or transmission of alerting messages is limited to authorized individuals, for example police, emergency personnel, etc. through the use of public-key cryptography. For example, police and/or other individuals authorized to transmit geocast alerting messages may be assigned and/or generate private/public key pairs in order to digitally sign alerting messages. The public keys corresponding to the private keys may be freely distributed to communications devices configured to participate in geocast messaging. Alerting messages can be digitally signed and/or encrypted using an authorized sender's private key. An alerting message secured in such a way may only be rendered by a receiving device if the digital signature can be verified. An alerting message signed with the private key of an authorized sender may be verified at a receiving communications device by applying the sender's corresponding public key to decrypt the alerting message, allowing the alerting message content to be rendered on the receiving communications device.

Once the alerting system has been activated, target geocast regions and/or sub regions (i.e., those alerting regions and/or sub regions that should receive geocast alerting messages) may be identified. The process of identifying target geocast regions may begin by determining a geographic region that may potentially be affected by the emergent situation (not shown). The size and scope of such a region may depend on multiple factors, for example the type of the emergent situation, the severity of the emergent situation, the time of day, the number of mobile communication devices and/or people located proximally to the emergent situation, real-time traffic conditions, and the like. The potentially effected geographic region may be determined automatically by alerting system software, manually by a user of the alerting system, or by any combination thereof. In an alternate embodiment, multiple potentially effected geographic regions may be determined separately or concurrently.

Once a potentially effected geographic region has been determined, it may be compared against predefined geocast alerting regions. The comparison may include determining whether the potentially effected geographic region is the same as, a part of, overlaps with, or is remote from each of the predefined geocast alerting regions. In an embodiment, if no predefined geocast alerting regions exist, a target geocast alerting region may be defined based on the potentially effected geographic region. Target geocast regions may be identified based on the results of the comparison. The above-described process of identifying target geocast regions and/or sub regions may be carried out automatically by the alerting system, for example in accordance with default alerting scenarios and/or rules. For example, in the event of a severe weather event, such as an approaching ice storm that will affect a geographic region that includes the entirety of the campus, all geocast alerting regions on campus may be identified as target geocast regions via a default alerting scenario. Alternatively, target geocast regions and/or sub regions that should receive alerting messages may be identified and selected manually by a user of the alerting system, for example through the use of an alerting system user interface. For example, in the terrorist attack and hostage situation of FIG. 5, the potential geographic region likely to be affected by the hostage situation may be defined as the student union and its immediate surroundings. The potential effect of the hostage situation is likely to be greatest for individuals located in the student union itself, and to a lesser degree for those located in other more remote geographic areas of the campus. As a result, geocast alerting regions 502, 506, 512, 520, and 522 may be manually identified as target geocast regions, for the reasons provided elsewhere herein.

Once target geocast regions and/or sub regions have been identified, customized alerting messages 526 containing appropriate information and/or instructions can be transmitted to each of the target geocast alerting regions. The alerting messages are formatted in accordance with a scalable wireless geocast protocol that includes the location (e.g., coordinates) of the sending, or transmitting, communications device and a description of the location (e.g., coordinates) of the target geocast alerting region. A receiving communications device, upon receiving an alerting message 526, will compare the location of the target geocast alerting region, as provided in the alerting message 526, with its current location. If the locations match, that is, if the location of the receiving communications device is the same as, within, or overlaps, the location of the target geocast alerting region, the alerting message is further processed and content of the alerting message may be rendered on the receiving communications device. If the locations do not match, content of the alerting message is not rendered, and the alerting message may or may not be retransmitted by the receiving communications device.

Alerting messages may be transmitted from the campus alerting system via a number of methods. In an embodiment, alerting message may be transmitted using the above-described techniques of tiered geocasting and forwarding zones, thereby avoiding the use of traditional wireless network elements and/or infrastructure. In another embodiment, alerting messages may be transmitted from the campus alerting system via a combination of geocasting and traditional wireline and/or wireless network infrastructure. For example, alerting messages may be initially transmitted to one or more base station controllers located proximally to the individual geocast alerting regions on campus (not shown). The alerting messages may be retransmitted wirelessly from the base station controllers and received by one or more mobile communications devices in each alerting region that are configured to participate in geocast messaging. The receiving communications devices may then retransmit the alerting messages within the ad hoc networks of their corresponding geocast alerting regions.

Alerting messages can be customized for individual geocast alerting regions. One way that alerting messages may be customized is through varying the content of the altering messages. For example, the content of alerting messages transmitted to alerting regions 502 and 506 may include simple text to inform individuals at the corresponding locations that an emergency is taking place at the student union and to provide instructions that individuals should stay in their current locations, return to their rooms, or the like. An alerting message with different content may be transmitted to alerting region 512, the second floor of the student union. This alerting message might be more specific, and may include text informing individuals that a terrorist attack has occurred, that a hostage situation is taking place on the first floor, that the terrorists/hostage takers are armed and dangerous, and instructing everyone remaining on the second floor of the student union to move to the northwest corner of the building for evacuation by emergency personnel. The text content may also be supplemented with additional content, for example a map of the second floor of the student union for display on the communications devices, directions to the evacuation site, pictures of the terrorists, audible instructions, and the like.

Alerting messages may also contain multiple portions of content. One or more portions of the content may be tailored based upon, for example, a context condition associated with the target geocast alerting region. A context condition may relate to how a communications device is situated within a geocast alerting region. Multiple context conditions may be specified for a single geocast alerting region. Content provided based upon the context condition may only be relevant for communications devices meeting the context condition. For example, a portion of alerting message content may be contextually linked to the condition that a communications device be moving in a particular direction, or moving at a particular speed, etc. It is to be understood that these movement related conditions are merely exemplary and not to be construed as limiting structure or function. A portion of an alerting message tailored based upon a context condition will be rendered only by communications devices to which the context condition applies. Tailoring a portion of alerting message content based upon a context condition may allow for providing context specific information to communications devices located within the target geocast region. Alerting messages containing portions of content tailored based upon a context condition may also contain portions of common content that apply universally to all communications devices located within a geocast alerting region, and should thus be rendered by all communications devices within that geocast alerting region.

Alerting messages may also contain content portions tailored for varying types of receiving devices. In an embodiment, the tailored portions may all relate to the same alerting situation, but each portion may have device specific content associated with it. For example, an alerting message advising of the example terrorist attack may contain a first content portion containing an image and/or text specifically formatted for rendering on mobile communications devices with small and/or limited display screen resolutions. A second content portion may be formatted with larger, more elaborate images suitable for display on mobile communications devices with larger display screen resolutions. The individual portions of content may be tagged such that a particular receiving communications device will attempt to render only a portion of content appropriate for display on that receiving device.

Returning to FIG. 5, an alerting message with a portion of common content and portions of content tailored based upon context conditions are transmitted to geocast alerting regions 520 and 522. For example, the context conditions may apply to a direction and/or speed of movement of motor vehicles 528 and 530. The portion of common content in the alerting messages received at geocast alerting regions 520 and 522 may be relevant to all members of the respective geocast alerting regions, for example information that an emergency is taking place at the student union. The portions of content tailored based upon the direction and/or speed of movement of the motor vehicles may provide, for instance, directions or instructions to motorists so that they avoid the area of the student union altogether. In another example, virtual detours may be created directing motorists to circumvent the student union. Because appropriate directions and/or instructions may vary depending on the direction of travel and speed of each particular motor vehicle, the alerting message may comprise multiple portions of content tailored based upon the context conditions. A communications device belonging to an ad hoc network in a geocast region and located in a moving motor vehicle may first determine whether the communications device is moving, and if so in what direction and at what speed.

Once this determination is made, the communications device may parse the portions of content tailored based on the context conditions, in order to select and render an appropriate content portion. For example, motor vehicle 530, traveling east in geocast alerting region 520, may receive a geocast alerting message with a portion of common content and one or more portions of content tailored according to the direction and/or speed of movement of a communications devices in geocast alerting region 520. The portion of common content may inform of an emergency at the student union. The mobile communications device associated with motor vehicle 530, upon receiving the alerting message and rendering the common content, may also determine that it is moving eastward at a certain speed, and may parse the alerting message for an appropriate portion of tailored content. For example, the alerting message may contain a portion of tailored content for drivers heading east in alerting region 520. This portion of tailored content may provide, for example, text, visual, and/or audio instructions that motorists should continue to drive straight, avoiding the student union. Additionally, the portion of tailored content may include information about street closures in the area, or other information related to the emergency.

A geocast alerting message is typically not rendered by a receiving mobile communications device if that device is not located in the geographic location corresponding to the target geocast alerting region. For example, motor vehicle 532 traveling south near the student union, and a group of students 534 walking toward the student union are not currently located within one of the example campus geocast alerting regions, and therefore mobile communications devices located with motor vehicle 532 and/or students 534 may retransmit, but will likely not render, geocast alerting messages pertaining to the terrorist attack. However, as these individuals enter one of the target geocast alerting regions, their respective mobile communications devices will thereafter render geocast alerting messages transmitted to or retransmitted within the respective geocast alerting regions.

It is also possible with the geocast campus alerting system to exclude particular geocast alerting regions from receiving alerting messages. For example, it may not be desirable to transmit alerting messages to geocast alerting region 510, the first floor of the student union building. Transmitting alerting messages to geocast region 510 presents a risk that a terrorist/hostage taker with a mobile communications device may intercept an alerting message, which might in turn endanger individuals attempting to escape from the second floor. Additionally, it may not be desirable to transmit alerting messages to geocast region 516 if a game is currently being played at the campus stadium 518. Distributing an alerting message regarding a campus emergency at a crowded stadium may cause unnecessary panic if the emergency is taking place in an area of the campus remote from the stadium, presenting no imminent danger to spectators at the stadium. Accordingly, geocast alerting regions 510 and 516 are omitted from receiving alerting messages pertaining to the terrorist attack/hostage situation.

Alerting messages may be customized for each individual geocast alerting region. The content of the alerting messages may be determined manually, for example via an alerting system user interface, may be determined automatically by alerting system software, or may be determined using a combination of manual and auto-generated determinations. In an embodiment, geocast alerting software may determine the content of alerting messages using a number of factors pertaining to a particular geocast alerting region, for example the type of the emergent situation, the severity of the emergent situation, the distance of the geocast alerting region from the geographical location of the emergent situation, the time of day, the number of mobile communication devices and/or people located within the geocast alerting region, real-time traffic conditions, and the like. The content of alerting messages may also be determined and provided by a user of a geocast alerting system interface. When transmitted alerting messages are received at one or more mobile communications devices within the geocast alerting region, the alerting message may be retransmitted and distributed by and among mobile communications devices of the corresponding ad hoc geocast network.

Variable types of content may be contained within a geocast alerting message. In one embodiment, the alerting message may contain plain text. In another embodiment, a map may be provided as a standalone alerting message, or may be provided as a supplement to alerting message text. An alerting message map may be depicted on one or more display screens of the receiving mobile communications device. Maps included within or serving as alerting messages may be used to inform an individual within the geocast alerting region of important information pertaining to the emergent situation and/or information about the individual's surroundings. For example, an alerting message map may contain a representation of the current location of the receiving mobile communications device. The current location of the receiving mobile communications device may be depicted in respect to the location of the emergent situation. Additionally, the map may display the coordinates of a safe location that the individual may retreat to. The mobile communications device may overlay directions to the safe location visually on the map display, may provide text or voice directions to accompany the displayed map, or may use a combination of these techniques to guide the user to the safe location. The map and/or directions may be updated dynamically as the emergent situation changes with time. Alerting messages may also contain other forms of content or media, for example audio, video, pictures, graphics, images, multimedia, and the like. Content might also include links, for example hyperlinks or other electronic pointers directing a communications device to other files or media stored locally or remotely from the receiving communications device, online information, online downloads, a server providing real-time information relating to the emergent situation, and the like. A receiving communications device may render selected content portions of a geocast alerting message based upon, for example, physical limitations of the receiving communications device, preferences (e.g., settings in a user profile), and the like.

Alerting messages comprising updated alerting information about the emergent situation may be transmitted to geocast alerting regions as the emergent situation changes with time. For example, when the terrorist attack/hostage situation is resolved, updating alerting messages can be transmitted to all affected geocast alerting regions providing information that the threat no longer exists and that it is safe to resume normal activities. Updating alerting messages may be transmitted at prescribed intervals, or may be manually triggered by a user of the geocast alerting system. The content of the updating alerting messages may be automatically determined, may be determined manually by a user of the geocast alerting system, or may be determined using a combination of automatic and manual determinations.

A specialized type of geocast message, namely a geographic query ("geoquery") message, enables additional functionality in geocast alerting. A geoquery message functions to query all mobile communications devices within a specific geocast region that are configured to communicate via geocast messaging. A unique feature of geoquery messages is that they may specify whether a geoquery response message from a receiving mobile communications device is mandatory or voluntary. A geoquery packet may contain a number of portions, such as destination and sending address portions, and a query content portion. A destination address portion typically defines a geocast region within which the geoquery message should be propagated. The geocast region for a geoquery message may be defined using the above-discussed techniques for defining geocast regions. A sending address portion may provide an indication of a location of the mobile communications device that first transmitted the geoquery message (i.e., the device from which the message originated). The sending address portion may also act as a return destination address for geoquery response message packets transmitted by receiving communications devices in response to the geoquery message. The query content portion contains the substance of the query and may also contain an indicator of whether a geoquery response message by a receiving communications device is mandatory or voluntary. In an embodiment, if a geoquery response message is mandatory, the receiving communications device may transmit a geoquery response message automatically, regardless of interaction from a user of the receiving communications device. Alternatively, a user of the receiving communications device may be presented with an opportunity to compose content for inclusion in the mandatory geoquery response message before it is transmitted.

In an embodiment, an example use of geoquery messaging is to locate survivors at the scene of an emergent situation. For example, in the event of a partial building collapse, an emergency responder may transmit a first type of geoquery alerting message with a mandatory response indicator and containing: a destination address portion defining a geocast region encompassing the immediate vicinity of the collapsed building; a sending address portion corresponding to the geographic location of the emergency responder; and a query content portion. The query content portion may comprise a question to be answered by users of receiving communications devices, for example, "Are you hurt?", "Are you able to exit the building?", or the like. Each mobile communications device located within the geocast region and configured for geocast messaging will transmit a corresponding geoquery response message. The geoquery response message may contain a destination address portion corresponding to the emergency responder's location, a sending address portion identifying the geographic location of the receiving mobile communications device, and a query response content portion. The query response content portion may contain a user response to the query content portion. If no user interaction is detected by the receiving communications device within a specific interval of time, the receiving communications device may transmit a geoquery response message automatically, perhaps containing query response content indicating that no user interaction is available. In another embodiment, if the receiving mobile communications device is capable of detecting biometric feedback from the user in possession of the receiving mobile communications device, information pertaining to that feedback may be encapsulated within the query response content. When the geoquery response message is received at the mobile communications device of the emergency responder, an indication of the geographic location of the receiving device may be rendered on a display of the emergency responder's mobile communications device. The indication may comprise, for example, an icon overlaid on a graphical map of the geoquery destination geocast region. The emergency responder may use such an indication to determine and/or reach the location of the receiving communications device within the partially collapsed building.

In another embodiment, the emergency responder may transmit a second type of geoquery message. Like the first type of geoquery message, the second type of geoquery message may contain similar portions and require a mandatory geoquery response from a receiving communications device. However, the mandatory geoquery response to this second type of geoquery message may comprise executing a behavior routine on the receiving communications device. In an embodiment, a preprogrammed behavior routine may be stored within a memory on the receiving communications device. The query content portion of the geoquery message may contain a command or other form of instructions that, when the query content portion is rendered by the receiving communications device, causes the receiving communications device to invoke the behavior routine. In another embodiment, the query portion may contain a list of script commands, or any other appropriate form of programming, that are executed on the receiving communications device when the query content portion is rendered by the receiving communications device. The script commands, when executed, may invoke the behavior routine on the receiving communications device.

Behavior routines may be simple or complex, and may invoke various features and/or functions of the receiving communications device, as appropriate. For example, a behavior routine may cause a receiving communications device to awaken from a sleep mode, flash a light source on the device such as a display screen, emit an audible tone, vibrate, and/or send a message, and return to the sleep mode. The behavior routine may be invoked repeatedly in a pattern at specified time intervals. It is to be understood that the behavior routine described herein is merely an example, and that the scope of the instant disclosure should not be limited thereto.

This second type of geoquery message may be advantageous in locating the user of a receiving communications device who is incapacitated or otherwise unable to respond to an initial geoquery message, for example in a scenario when an emergency responder reaches the geographic location indicated in a geoquery response message to the first type of geoquery message, but still fails to locate the receiving communications device or its user (e.g., when the device and/or user are buried underneath rubble). The first responder may send a geoquery message of the same type to invoke an audible beeping behavior routine on the buried user's communications device. When the mobile communications device renders the geoquery message, the beeping routine will be invoked and the first responder my then follow the audible tone emitted by the receiving communications device in order to better pinpoint its exact location. The audible tone emitted by the buried user's communications device may be configured to modulate as the distance shortens between the emergency responder's communications device and the buried user's communications device. The audible tone may be modulated in a variety of ways, for instance by volume, by pitch, by repetition speed, and the like. It is to be understood that the use of an audible tone is merely an example of a locator function that may be activated on a receiving communications device, and the scope of the instant disclosure should not be limited thereto.

In another embodiment, geoquery messages may be employed in a logistical context. Geoquery messages may be used to obtain helpful situational information for a geocast alerting region. Information such as the number of receiving mobile communications devices located in a particular geocast region may be useful to emergency responders in creating plans for how to handle logistical aspects of responding to an emergent situation. For example, referring again to FIG. 5, the number of receiving mobile communications devices in alerting region 512, indicating a rough estimate of the number of individuals on the second floor of the student union, may be gathered via geoquery response messages. This information might allow emergency responders to deploy appropriate measures of manpower and/or equipment to rescue the individuals on the second floor of the student union building. Additional information may be gathered from geoquery response messages. For example, a geoquery response message might contain within the query response content portion information associated with each receiving mobile communications device in the geocast region, such as the mobile identification number (MIN) assigned to the device, the device's electronic serial number (ESN), and the like. This information may allow police and/or emergency responders to discover the identity of individuals who are located within the geocast alerting region.

In an embodiment, receipt of a geocast alerting message may preempt other applications or functions executing on the mobile communications device. For example, a phone call taking place on a receiving mobile communications device may be temporarily interrupted so the user of the mobile communications device may be informed of the arrival of the geocast alerting message. After interruption of the executing function, the user may be provided with an option to render the content of the geocast alerting information immediately, or at another time of the user's choosing. Alternatively, the geocast alerting message may be automatically rendered by the mobile communications device without querying the user for permission to render the content, or the user may not be allowed to execute other applications and/or functions on the mobile communications device before acknowledging receipt of the alerting message.

Figure 6:
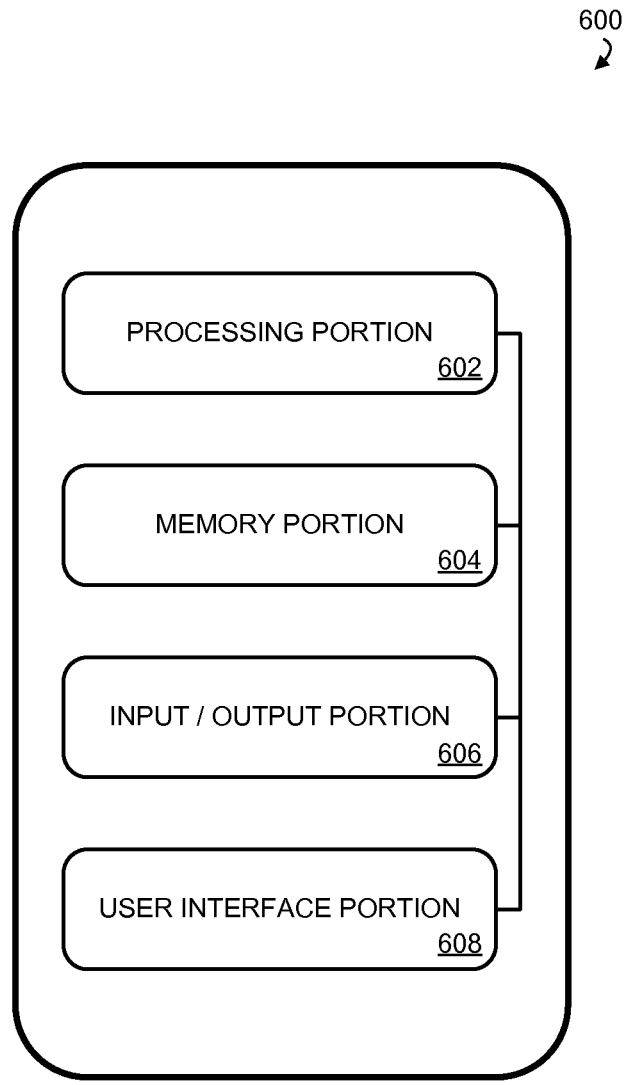
FIG. 6 is a block diagram of an example communications device configured to communicate in an ad hoc network of communications devices in accordance with a scalable wireless geocast protocol.

FIG. 6 is a block diagram of an example communications device 600 configured to communicate in an ad hoc network of communications devices in accordance with a scalable wireless geocast protocol. In an example configuration, communications device 600 is a mobile wireless device. The communications device can comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a walkmans, etc.), a portable navigation device (e.g., GPS compatible device, A-GPS compatible device, etc.), or a combination thereof. The communications device 600 can include devices that are not typically thought of as portable, such as, for example, a public computing device, a navigation device installed in-vehicle, a set top box, or the like. The communications device 600 can include non-conventional computing devices, such as, for example, a kitchen appliance, a motor vehicle control (e.g., steering wheel), etc., or the like.

The communications device 600 can include any appropriate device, mechanism, software, and/or hardware for communication in an ad hoc network of communications devices in accordance with a scalable wireless geocast protocol as described herein. In an example embodiment, the ability to communicate in an ad hoc network of communications devices in accordance with a scalable wireless geocast protocol is a feature of the communications device 600 that can be turned on and off. Thus, an owner of the communications device 600 can opt-in or opt-out of this capability.

In an example configuration, the communications device 600 comprises a processing portion 602, a memory portion 604, an input/output portion 606, and a user interface (UI) portion 608. It is emphasized that the block diagram depiction of communications device 600 is exemplary and not intended to imply a specific implementation and/or configuration. For example, in an example configuration, the communications device 600 comprises a cellular phone and the processing portion 602 and/or the memory portion 604 are implemented, in part or in total, on a subscriber identity module (SIM) of the communications device. In another example configuration, the communications device 600 comprises a laptop computer. The laptop computer can include a SIM, and various portions of the processing portion 602 and/or the memory portion 604 can be implemented on the SIM, on the laptop other than the SIM, or any combination thereof.

The processing portion 602, memory portion 604, and input/output portion 606 are coupled together to allow communications therebetween. In various embodiments, the input/output portion 606 comprises a receiver of the communications device 600, a transmitter of the communications device, or a combination thereof. The input/output portion 606 is capable of receiving and/or providing information pertaining to communication in an ad hoc network of communications devices in accordance with a scalable wireless geocast protocol as described above. For example, the input/output portion 606 is capable of receiving and/or sending a message containing geographic information pertaining to a geocast alerting region, geocast alerting message content, and the like, as described herein. In an example embodiment, the input/output portion is capable of receiving and/or sending information to determine a location of the communications device. In an example configuration, the input\output portion 606 comprises a GPS receiver. In various configurations, the input/output portion can receive and/or provide information via any appropriate means, such as, for example, optical means (e.g., infrared), electromagnetic means (e.g., RF, Wi-Fi, Bluetooth®, ZigBee™, etc.), acoustic means (e.g., speaker, microphone, ultrasonic receiver, ultrasonic transmitter), or a combination thereof.

The processing portion 602 is capable of performing functions pertaining to communicating in an ad hoc network of communications devices in accordance with a scalable wireless geocast protocol as described above. For example, the processing portion 602 is capable of determining message content, such as location information, alerting content, whether the communications device has previously received the same message at least a predetermined number of times, whether a sending communications device is closer than a minimum distance away, whether the communications device is closer to the center of a geocast region than any sending communications device from which a message was received, or the like, as described above. Message content can comprise text, maps, audio, video, pictures, graphics, images, multimedia, links to downloadable information, or any combination thereof.

In a basic configuration, the communications device 600 can include at least one memory portion 604. The memory portion can store any information utilized in conjunction with communicating in an ad hoc network of communications devices in accordance with a scalable wireless geocast protocol as described above. For example, the memory portion 604 is capable of storing information pertaining to a location of a communications device, a location of a geocast region, a content type, the number of times a message has previously been received by the communications device, whether a sending communications device is closer than a minimum distance, whether the communications device is closer to the center of a geocast region than any sending communications device from which a message was received, or a combination thereof, as described above. Depending upon the exact configuration and type of processor, the memory portion 604 can be volatile (such as some types of RAM), non-volatile (such as ROM, flash memory, etc.), or a combination thereof. The mobile communications device 600 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device.

The communications device 600 also can contain a user interface (UI) portion 608 allowing a user to communicate with the communications device. The UI portion is capable of rendering any information utilized in conjunction with communicating in an ad hoc network of communications devices in accordance with a scalable wireless geocast protocol as described above. For example, the UI portion can render geocast alerting message content or the like, as described above. The UI portion can provide the ability to control the communications device, via, for example, buttons, soft keys, voice actuated controls, a touch screen, movement of the communications device, visual cues (e.g., moving a hand in front of a camera integrated in the communications device (not shown)), or the like. The UI portion can provide visual information (e.g., via a display), audio information (e.g., via speaker), mechanically (e.g., via a vibrating mechanism), or a combination thereof. In various configurations, the UI portion 608 can comprise a display, a touch screen, a keyboard, an accelerometer, a motion detector, a speaker, a microphone, a camera, a tilt sensor, or any combination thereof. The UI portion 608 can comprise means for inputting biometric information, such as, for example, fingerprint information, retinal information, voice information, and/or facial characteristic information.

Although not necessary to implement communications in an ad hoc network of communications devices in accordance with a scalable wireless geocast protocol, the communications device 600 can be part of and/or in communications with various wireless communications networks and/or network components. Some of which are described below.

Figure 7:
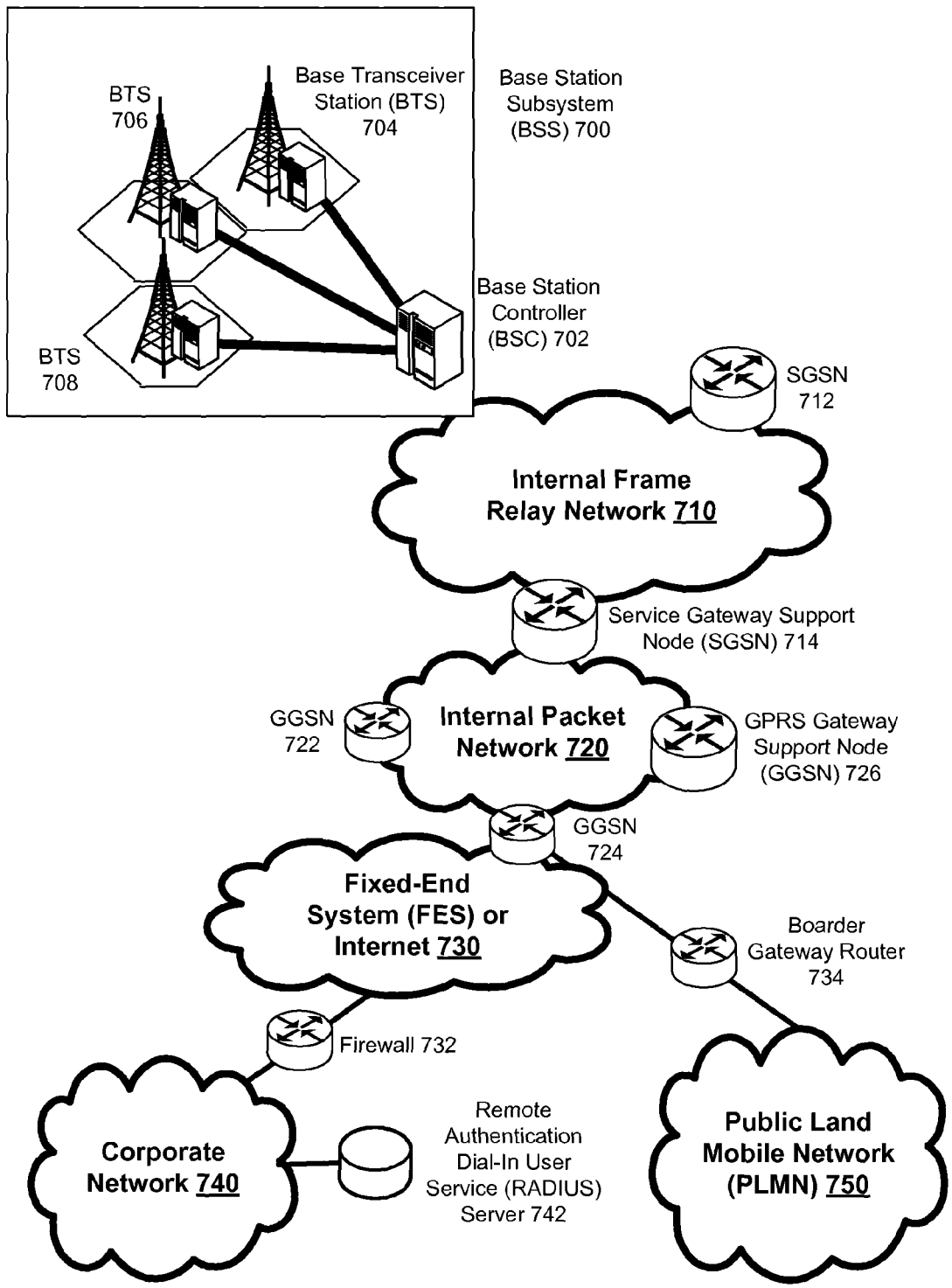
FIG. 7 depicts an example packet-based mobile cellular network environment, such as a GPRS network, in which communications in an ad hoc network of communications devices in accordance with a scalable wireless geocast protocol can be implemented.

FIG. 7 depicts an example packet-based mobile cellular network environment, such as a GPRS network, in which communications in an ad hoc network of communications devices in accordance with a scalable wireless geocast protocol can be implemented. In the example packet-based mobile cellular network environment shown in FIG. 7, there are a plurality of Base Station Subsystems ("BSS") 700 (only one is shown), each of which comprises a Base Station Controller ("BSC") 702 serving a plurality of Base Transceiver Stations ("BTS") such as BTSs 704, 706, and 708. BTSs 704, 706, 708, etc. are the access points where users of packet-based mobile devices become connected to the wireless network. In exemplary fashion, the packet traffic originating from user devices is transported via an over-the-air interface to a BTS 708, and from the BTS 708 to the BSC 702. Base station subsystems, such as BSS 700, are a part of internal frame relay network 710 that can include Service GPRS Support Nodes ("SGSN") such as SGSN 712 and 714. Each SGSN is connected to an internal packet network 720 through which a SGSN 712, 714, etc. can route data packets to and from a plurality of gateway GPRS support nodes (GGSN) 722, 724, 726, etc. As illustrated, SGSN 714 and GGSNs 722, 724, and 726 are part of internal packet network 720. Gateway GPRS serving nodes 722, 724 and 726 mainly provide an interface to external Internet Protocol ("IP") networks such as Public Land Mobile Network ("PLMN") 750, corporate intranets 740, or Fixed-End System ("FES") or the public Internet 730. As illustrated, subscriber corporate network 740 may be connected to GGSN 724 via firewall 732; and PLMN 750 is connected to GGSN 724 via boarder gateway router 734. The Remote Authentication Dial-In User Service ("RADIUS") server 742 may be used for caller authentication when a user of a mobile cellular device calls corporate network 740.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 8:
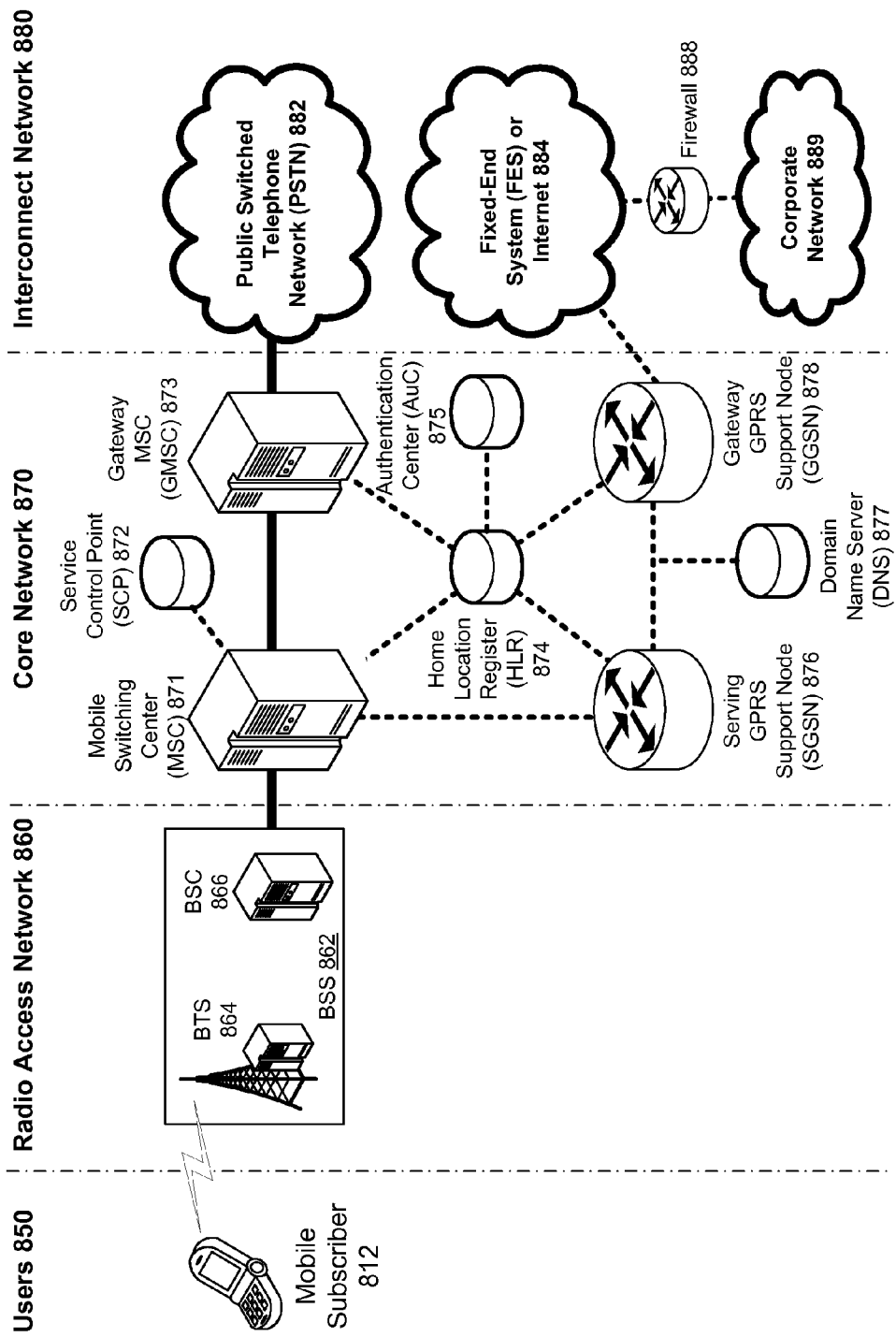
FIG. 8 depicts an example architecture of a typical GPRS network in which communications in an ad hoc network of communications devices in accordance with a scalable wireless geocast protocol can be implemented.

FIG. 8 illustrates an architecture of a typical GPRS network in which communications in an ad hoc network of communications devices in accordance with a scalable wireless geocast protocol can be implemented. The architecture depicted in FIG. 8 is segmented into four groups: users 850, radio access network 860, core network 870, and interconnect network 880. Users 850 comprise a plurality of end users. Note: device 812 is referred to as a mobile subscriber in the description of the network shown in FIG. 8. In an example embodiment, the device depicted as mobile subscriber 812 comprises a communications device (e.g., communications device 600). Radio access network 860 comprises a plurality of base station subsystems such as BSSs 862, which include BTSs 864 and BSCs 866. Core network 870 comprises a host of various network elements. As illustrated in FIG. 8, core network 870 may comprise Mobile Switching Center ("MSC") 871, Service Control Point ("SCP") 872, gateway MSC 873, SGSN 876, Home Location Register ("HLR") 874, Authentication Center ("AuC") 875, Domain Name Server ("DNS") 877, and GGSN 878. Interconnect network 880 also comprises a host of various networks and other network elements. As illustrated in FIG. 8, interconnect network 880 comprises Public Switched Telephone Network ("PSTN") 882, Fixed-End System ("FES") or Internet 884, firewall 888, and Corporate Network 889.

A mobile switching center can be connected to a large number of base station controllers. At MSC 871, for instance, depending on the type of traffic, the traffic may be separated in that voice may be sent to Public Switched Telephone Network ("PSTN") 882 through Gateway MSC ("GMSC") 873, and/or data may be sent to SGSN 876, which then sends the data traffic to GGSN 878 for further forwarding.

When MSC 871 receives call traffic, for example from BSC 866, it sends a query to a database hosted by SCP 872. The SCP 872 processes the request and issues a response to MSC 871 so that it may continue call processing as appropriate.

The HLR 874 is a centralized database for users to register to the GPRS network. HLR 874 stores static information about the subscribers such as the International Mobile Subscriber Identity ("IMSI"), subscribed services, and a key for authenticating the subscriber. HLR 874 also stores dynamic subscriber information such as the current location of the mobile subscriber. Associated with HLR 874 is AuC 875. AuC 875 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 8, when the mobile subscriber 812 initiates the attach process by turning on the network capabilities of the mobile device, an attach request is sent by mobile subscriber 812 to SGSN 876. The SGSN 876 queries another SGSN, to which mobile subscriber 812 was attached before, for the identity of mobile subscriber 812. Upon receiving the identity of mobile subscriber 812 from the other SGSN, SGSN 876 requests more information from mobile subscriber 812. This information is used to authenticate mobile subscriber 812 to SGSN 876 by HLR 874. Once verified, SGSN 876 sends a location update to HLR 874 indicating the change of location to a new SGSN, in this case SGSN 876. HLR 874 notifies the old SGSN, to which mobile subscriber 812 was attached before, to cancel the location process for mobile subscriber 812. HLR 874 then notifies SGSN 876 that the location update has been performed. At this time, SGSN 876 sends an Attach Accept message to mobile subscriber 812, which in turn sends an Attach Complete message to SGSN 876.

After attaching itself with the network, mobile subscriber 812 then goes through the authentication process. In the authentication process, SGSN 876 sends the authentication information to HLR 874, which sends information back to SGSN 876 based on the user profile that was part of the user's initial setup. The SGSN 876 then sends a request for authentication and ciphering to mobile subscriber 812. The mobile subscriber 812 uses an algorithm to send the user identification (ID) and password to SGSN 876. The SGSN 876 uses the same algorithm and compares the result. If a match occurs, SGSN 876 authenticates mobile subscriber 812.

Next, the mobile subscriber 812 establishes a user session with the destination network, corporate network 889, by going through a Packet Data Protocol ("PDP") activation process. Briefly, in the process, mobile subscriber 812 requests access to the Access Point Name ("APN"), for example, UPS.com, and SGSN 876 receives the activation request from mobile subscriber 812. SGSN 876 then initiates a Domain Name Service ("DNS") query to learn which GGSN node has access to the UPS.com APN. The DNS query is sent to the DNS server within the core network 870, such as DNS 877, which is provisioned to map to one or more GGSN nodes in the core network 870. Based on the APN, the mapped GGSN 878 can access the requested corporate network 889. The SGSN 876 then sends to GGSN 878 a Create Packet Data Protocol ("PDP") Context Request message that contains necessary information. The GGSN 878 sends a Create PDP Context Response message to SGSN 876, which then sends an Activate PDP Context Accept message to mobile subscriber 812.

Once activated, data packets of the call made by mobile subscriber 812 can then go through radio access network 860, core network 870, and interconnect network 880, in a particular fixed-end system or Internet 884 and firewall 888, to reach corporate network 889.

Figure 9:
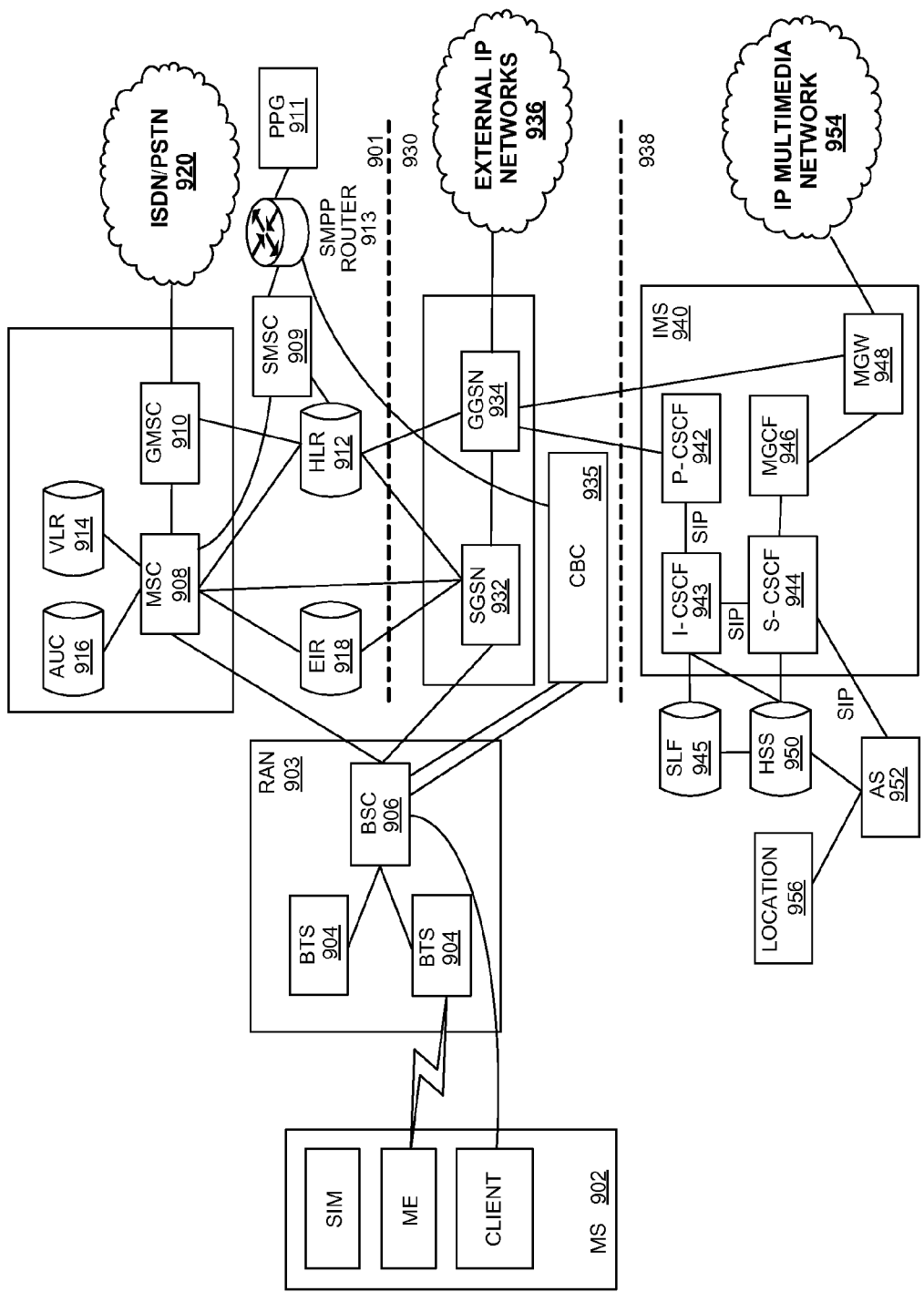
FIG. 9 depicts an example GSM/GPRS/IP multimedia network architecture within which communications in an ad hoc network of communications devices in accordance with a scalable wireless geocast protocol can be implemented.

FIG. 9 illustrates an example GSM/GPRS/IP multimedia network architecture within which communications in an ad hoc network of communications devices in accordance with a scalable wireless geocast protocol can be implemented. As illustrated, the architecture of FIG. 9 includes a GSM core network 901, a GPRS network 930 and an IP multimedia network 938. The GSM core network 901 includes a Mobile Station (MS) 902, at least one Base Transceiver Station (BTS) 904 and a Base Station Controller (BSC) 906. The MS 902 is physical equipment or Mobile Equipment (ME), such as a mobile phone or a laptop computer that is used by mobile subscribers, with a Subscriber Identity Module (SIM) or a Universal Integrated Circuit Card (UICC). The SIM or UICC includes an International Mobile Subscriber Identity (IMSI), which is a unique identifier of a subscriber. The BTS 904 is physical equipment, such as a radio tower, that enables a radio interface to communicate with the MS. Each BTS may serve more than one MS. The BSC 906 manages radio resources, including the BTS. The BSC may be connected to several BTSs. The BSC and BTS components, in combination, are generally referred to as a base station subsystem (BSS) or radio access network (RAN) 903.

The GSM core network 901 also includes a Mobile Switching Center (MSC) 908, a Gateway Mobile Switching Center (GMSC) 910, a Home Location Register (HLR) 912, Visitor Location Register (VLR) 914, an Authentication Center (AuC) 916, and an Equipment Identity Register (EIR) 918. The MSC 908 performs a switching function for the network. The MSC also performs other functions, such as registration, authentication, location updating, handovers, and call routing. The GMSC 910 provides a gateway between the GSM network and other networks, such as an Integrated Services Digital Network (ISDN) or Public Switched Telephone Networks (PSTNs) 920. Thus, the GMSC 910 provides interworking functionality with external networks.

The HLR 912 is a database that contains administrative information regarding each subscriber registered in a corresponding GSM network. The HLR 912 also contains the current location of each MS. The VLR 914 is a database that contains selected administrative information from the HLR 912. The VLR contains information necessary for call control and provision of subscribed services for each MS currently located in a geographical area controlled by the VLR. The HLR 912 and the VLR 914, together with the MSC 908, provide the call routing and roaming capabilities of GSM. The AuC 916 provides the parameters needed for authentication and encryption functions. Such parameters allow verification of a subscriber's identity. The EIR 918 stores security-sensitive information about the mobile equipment.

A Short Message Service Center (SMSC) 909 allows one-to-one Short Message Service (SMS) messages to be sent to/from the MS 902. A Push Proxy Gateway (PPG) 911 is used to "push" (i.e., send without a synchronous request) content to the MS 902. The PPG 911 acts as a proxy between wired and wireless networks to facilitate pushing of data to the MS 902. A Short Message Peer to Peer (SMPP) protocol router 913 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 902 sends a location update including its current location information to the MSC/VLR, via the BTS 904 and the BSC 906. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 930 is logically implemented on the GSM core network architecture by introducing two packet-switching network nodes, a serving GPRS support node (SGSN) 932, a cell broadcast and a Gateway GPRS support node (GGSN) 934. The SGSN 932 is at the same hierarchical level as the MSC 908 in the GSM network. The SGSN controls the connection between the GPRS network and the MS 902. The SGSN also keeps track of individual MS's locations and security functions and access controls.

A Cell Broadcast Center (CBC) 935 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 934 provides a gateway between the GPRS network and a public packet network (PDN) or other IP networks 936. That is, the GGSN provides interworking functionality with external networks, and sets up a logical link to the MS through the SGSN. When packet-switched data leaves the GPRS network, it is transferred to an external TCP-IP network 936, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 930 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vise versa.

The IP multimedia network 938 was introduced with 3GPP Release 5, and includes an IP multimedia subsystem (IMS) 940 to provide rich multimedia services to end users. A representative set of the network entities within the IMS 940 are a call/session control function (CSCF), a media gateway control function (MGCF) 946, a media gateway (MGW) 948, and a master subscriber database, called a home subscriber server (HSS) 950. The HSS 950 may be common to the GSM network 901, the GPRS network 930 as well as the IP multimedia network 938.

The IP multimedia system 940 is built around the call/session control function, of which there are three types: an interrogating CSCF (I-CSCF) 943, a proxy CSCF (P-CSCF) 942, and a serving CSCF (S-CSCF) 944. The P-CSCF 942 is the MS's first point of contact with the IMS 940. The P-CSCF 942 forwards session initiation protocol (SIP) messages received from the MS to an SIP server in a home network (and vice versa) of the MS. The P-CSCF 942 may also modify an outgoing request according to a set of rules defined by the network operator (for example, address analysis and potential modification).

The I-CSCF 943, forms an entrance to a home network and hides the inner topology of the home network from other networks and provides flexibility for selecting an S-CSCF. The I-CSCF 943 may contact a subscriber location function (SLF) 945 to determine which HSS 950 to use for the particular subscriber, if multiple HSSs 950 are present. The S-CSCF 944 performs the session control services for the MS 902. This includes routing originating sessions to external networks and routing terminating sessions to visited networks. The S-CSCF 944 also decides whether an application server (AS) 952 is required to receive information on an incoming SIP session request to ensure appropriate service handling. This decision is based on information received from the HSS 950 (or other sources, such as an application server 952). The AS 952 also communicates to a location server 956 (e.g., a Gateway Mobile Location Center (GMLC)) that provides a position (e.g., latitude/longitude coordinates) of the MS 902.

The HSS 950 contains a subscriber profile and keeps track of which core network node is currently handling the subscriber. It also supports subscriber authentication and authorization functions (AAA). In networks with more than one HSS 950, a subscriber location function provides information on the HSS 950 that contains the profile of a given subscriber.

The MGCF 946 provides interworking functionality between SIP session control signaling from the IMS 940 and ISUP/BICC call control signaling from the external GSTN networks (not shown). It also controls the media gateway (MGW) 948 that provides user-plane interworking functionality (e.g., converting between AMR- and PCM-coded voice). The MGW 948 also communicates with other IP multimedia networks 954.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the predefined area.

The various techniques for geocast alerting described herein can be implemented in connection with hardware or software or, where appropriate, with a combination of both. Thus, the methods and apparatuses for transmitting geocast alerting messages and otherwise communicating in an ad hoc network of communications devices in accordance with a scalable wireless geocast protocol can be implemented, or certain aspects or portions thereof, can take the form of program code (i.e., instructions) embodied in tangible storage media, such as floppy diskettes, CD-ROMs, hard drives, or any other machine-readable storage medium (computer-readable storage medium), wherein, when the program code is loaded into and executed by a machine, such as a computer, the machine becomes an apparatus for geocast alerting. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for communicating in an ad hoc network of communications devices in accordance with a scalable wireless geocast protocol also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for geocast alerting. When implemented on a general-purpose processor, the program code combines with the processor to provide a unique apparatus that operates to invoke the functionality of communicating in an ad hoc network of communications devices in accordance with a scalable wireless geocast protocol. Additionally, any storage techniques used in connection with communicating in an ad hoc network of communications devices in accordance with a scalable wireless geocast protocol can invariably be a combination of hardware and software.

While transmission and propagation of alerting messages via communications in an ad hoc network of communications devices in accordance with a scalable wireless geocast protocol have been described in connection with the various embodiments of the various figures, it is to be understood that other similar embodiments can be used or modifications and additions can be made to the described embodiments for transmission and propagation of alerting messages in an ad hoc network of communications devices in accordance with a scalable wireless geocast protocol without deviating therefrom. For example, one skilled in the art will recognize that communicating in an ad hoc network of communications devices in accordance with a scalable wireless geocast protocol as described in the present application may apply to any environment, whether wired or wireless, and may be applied to any number of such devices connected via a communications network and interacting across the network. Therefore, transmission and propagation of alerting messages in an ad hoc network of communications devices in accordance with a scalable wireless geocast protocol should not be limited to any single embodiment, but rather should be construed in breadth and scope in accordance with the appended claims.

What is claimed:

1. An apparatus comprising:
a processor; and
memory coupled to the processor, the memory comprising executable instructions that when executed by the processor cause the processor to effectuate operations comprising:
identifying a target geographic region for receipt of an alerting message pertaining to an emergent situation; and
providing the alerting message, the alerting message comprising an indication of the target geographic region and an indication of the emergent situation, wherein:
the alerting message is renderable by a recipient device of the alerting message based on a determination by the recipient device that a location at which the alerting message is received is within the target geographic region; and
the alerting message is retransmittable by the recipient device based on a determination by the recipient device that the alerting message has been received at least a predetermined number of times.

2. The apparatus of claim 1, wherein:
the alerting message is not renderable by the recipient device when a location at which the alerting message is received is not within the target geographic region.

3. The apparatus of claim 1, wherein:
the alerting message is not retransmittable by the recipient device when the alerting message has not been received at least a predetermined number of times.

4. The apparatus of claim 1, the operations further comprising:
identifying a plurality of target geographic regions for receipt of a respective plurality of alerting messages pertaining to the emergent situation;
determining respective content for each of the plurality of alerting messages; and
providing the plurality of alerting messages, each of the plurality of alerting message comprising:
an indication of a respective target geographic region; and
an indication of respective content.

5. The apparatus of claim 1, wherein:
the alerting message comprises a plurality of content portions;
each of the plurality of content portions comprises content tailored to a respective target geographic region;
tailored content is renderable by a recipient of the alerting message when a location at which the alerting message is received is within a respective target geographic region for the tailored content; and
tailored content is not renderable by a recipient of the alerting message when a location at which the alerting message is received is not within a respective target geographic region for the tailored content.

6. The apparatus of claim 1, wherein:
the alerting message further comprises a behavior routine; and
the behavior routine is invokable by a recipient of the alerting message when the alerting message is renderable by the recipient.

7. The apparatus of claim 1, wherein content of the alerting message is determined at a time when the indication of the emergent situation is received.

8. The apparatus of claim 1, wherein:
the alerting message is retransmittable by a recipient of the alerting message when the alerting message has been received at least a predetermined number of times and the alerting message was not sent from a location closer than a minimum distance from the location at which the alerting message was received; and
the alerting message is not retransmittable by a recipient of the alerting message when the alerting message has not been received at least a predetermined number of times or the alerting message was sent from a location closer than a minimum distance from the location at which the alerting message was received.

9. An apparatus comprising:
a processor; and
memory coupled to the processor, the memory comprising executable instructions that when executed by the processor cause the processor to effectuate operations comprising:
identifying a target geographic region for receipt of an alerting message pertaining to an emergent situation; and
providing the alerting message, the alerting message comprising an indication of the target geographic region and an indication of the emergent situation, wherein:
the alerting message is renderable by a recipient device of the alerting message based on relative movement of the recipient device to the target geographic region; and
the alerting message is retransmittable by the recipient device based on a determination by the recipient device that the alerting message has been received at least a predetermined number of times.

10. The apparatus of claim 9, wherein:
the alerting message is not renderable by the recipient device when a relative motion is indicative of the recipient device moving away from the target geographic region.

11. The apparatus of claim 9, wherein:
the alerting message is not retransmittable by the recipient device when the alerting message has not been received at least a predetermined number of times.

12. The apparatus of claim 9, the operations further comprising:
identifying a plurality of target geographic regions for receipt of a respective plurality of alerting messages pertaining to the emergent situation;
determining respective content for each of the plurality of alerting messages; and
providing the plurality of alerting messages, each of the plurality of alerting message comprising:
an indication of a respective target geographic region; and
an indication of respective content.

13. The apparatus of claim 9, wherein:
the alerting message comprises a plurality of content portions;
each of the plurality of content portions comprises content tailored to a respective target geographic region;
tailored content is renderable by a recipient of the alerting message when a location at which the alerting message is received is within a respective target geographic region for the tailored content; and
tailored content is not renderable by a recipient of the alerting message when a location at which the alerting message is received is not within a respective target geographic region for the tailored content.

14. The apparatus of claim 9, wherein:
the alerting message further comprises a behavior routine; and
the behavior routine is invokable by a recipient of the alerting message when the alerting message is renderable by the recipient.

15. The apparatus of claim 9, wherein content of the alerting message is determined at a time when the indication of the emergent situation is received.

16. The apparatus of claim 9, wherein:
the alerting message is retransmittable by a recipient of the alerting message when the alerting message has been received at least a predetermined number of times and the alerting message was not sent from a location closer than a minimum distance from the location at which the alerting message was received; and
the alerting message is not retransmittable by a recipient of the alerting message when the alerting message has not been received at least a predetermined number of times or the alerting message was sent from a location closer than a minimum distance from the location at which the alerting message was received.

17. An apparatus comprising:
a processor; and
memory coupled to the processor, the memory comprising executable instructions that when executed by the processor cause the processor to effectuate operations comprising:
receiving a signal comprising:
a plurality of messages; and
a plurality of target distribution regions, wherein each message of the plurality of messages is associated with a target distribution region of the plurality of target distribution regions;
comparing a location at which the signal is received with the plurality of target distribution regions; and
upon a determination that the location at which the signal is received is within one of the plurality of target distribution regions, rendering a message of the plurality of messages associated with the target distribution region at which the signal is received.

18. The apparatus of claim 17, wherein:
at least one message of the plurality of messages comprises a plurality of portions; and
each portion of the plurality of portions is associated with a respective target distribution region.

19. The apparatus of claim 17, wherein:
at least one message of the plurality of messages comprises a plurality of portions; and
each portion of the plurality of portions is associated with a respective message.

20. The apparatus of claim 17, wherein:
at least one message of the plurality of messages a plurality of content portions;
each of the plurality of content portions comprises content tailored to a respective target geographic region;
tailored content is renderable by a recipient device of an alerting message when a location at which the alerting message is received is within a respective target geographic region for the tailored content; and
tailored content is not renderable by a recipient device of an alerting message when a location at which the alerting message is received is not within a respective target geographic region for the tailored content.

\* \* \* \* \*